US012516266B2

(12) United States Patent
Rouillard

(10) Patent No.: US 12,516,266 B2
(45) Date of Patent: Jan. 6, 2026

(54) PROCESS FOR CONVERTING BIOSOURCED TRIGLYCERIDES INTO A SINGLE-PHASE COMPOSITION CONTAINING FATTY ACID ESTER AND RELATED USES AS BIOFUEL OR LUBRICANT

(71) Applicant: Autarcycle Inc., Lévis (CA)

(72) Inventor: Alain Rouillard, Lévis (CA)

(73) Assignee: AUTARCYCLE INC., Lévis (CA)

( * ) Notice: Subject to any disclaimer, the term of this patent is extended or adjusted under 35 U.S.C. 154(b) by 265 days.

(21) Appl. No.: 17/911,788

(22) PCT Filed: Dec. 15, 2020

(86) PCT No.: PCT/CA2020/051723
§ 371 (c)(1),
(2) Date: Sep. 15, 2022

(87) PCT Pub. No.: WO2021/184104
PCT Pub. Date: Sep. 23, 2021

(65) Prior Publication Data
US 2023/0357666 A1  Nov. 9, 2023

(51) Int. Cl.
*C11C 3/00* (2006.01)
*C10L 1/02* (2006.01)
*C10M 129/78* (2006.01)
*C10N 30/00* (2006.01)
*C10N 40/25* (2006.01)

(52) U.S. Cl.
CPC .............. *C11C 3/003* (2013.01); *C10L 1/026* (2013.01); *C10M 129/78* (2013.01); *C10L 2200/0476* (2013.01); *C10L 2270/026* (2013.01); *C10M 2207/30* (2013.01); *C10N 2030/64* (2020.05); *C10N 2040/252* (2020.05)

(58) Field of Classification Search
None
See application file for complete search history.

(56) References Cited

FOREIGN PATENT DOCUMENTS

WO 2004052874 A1 6/2004
WO 2016012343 A1 1/2016

OTHER PUBLICATIONS

Casas et al. Fuel (2013), 106, pp. 869-872.*
Najafi, Gholamhassan, and Talal Yusaf. "Experimental investigation of using methanol-diesel blended fuels in diesel engine." In Proceedings of the 4th international conference on thermal engineering theory and applications. 2009.
Zhang, G. D., H. Liu, X. X. Xia, W. G. Zhang, and J. H. Fang. "Effects of dimethyl carbonate fuel additive on diesel engine performances." Proceedings of the Institution of Mechanical Engineers, Part D: Journal of Automobile Engineering 219, No. 7 (2005): 897-903.
Ilham, Zul, and Shiro Saka. "Production of biodiesel with glycerol carbonate by non-catalytic supercritical dimethyl carbonate." Lipid Technology 23, No. 1 (2011): 10-13.
Ilham, Zul, and Shiro Saka. "Optimization of supercritical dimethyl carbonate method for biodiesel production." Fuel 97 (2012): 670-677.
Fabbri, Daniele, Valerio Bevoni, Marcello Notari, and Franco Rivetti. "Properties of a potential biofuel obtained from soybean oil by transmethylation with dimethyl carbonate." Fuel 86, No. 5-6 (2007): 690-697.
Rounce, Paul, Athanasios Tsolakis, P. Leung, and A. P. E. York. "A comparison of diesel and biodiesel emissions using dimethyl carbonate as an oxygenated additive." Energy & Fuels 24, No. 9 (2010): 4812-4819.
Fan, Pei, Jiayan Wang, Shiyou Xing, Lingmei Yang, Gaixiu Yang, Junying Fu, Changlin Miao, and Pengmei Lv. "Synthesis of glycerol-free biodiesel with dimethyl carbonate over sulfonated imidazolium ionic liquid." Energy & Fuels 31, No. 4 (2017): 4090-4095.
Marulanda, Victor F., George Anitescu, and Lawrence L. Tavlarides. "Biodiesel fuels through a continuous flow process of chicken fat supercritical transesterification." Energy & Fuels 24, No. 1 (2010): 253-260.
Bachler, Christine, Sigurd Schober, and Martin Mittelbach. "Simulated distillation for biofuel analysis." Energy & fuels 24, No. 3 (2010): 2086-2090.
Thangaraj, Baskar, Pravin Raj Solomon, Bagavathi Muniyandi, Srinivasan Ranganathan, and Lin Lin. "Catalysis in biodiesel production—a review." Clean Energy 3, No. 1 (2019): 2-23.
Wichmann, Hubertus, and Muefit Bahadir. "Bio-based Ester Oils for Use as Lubricants in Metal Working." Clean—Soil, Air, Water 35, No. 1 (2007): 49-51.
Estevez, Rafael, Laura Aguado-Deblas, Felipa M. Bautista, Diego Luna, Carlos Luna, Juan Calero, Alejandro Posadillo, and Antonio A. Romero. "Biodiesel at the crossroads: A critical review." Catalysts 9, No. 12 (2019): 1033.
Tang, Ying, Qitong Cheng, Hui CaO, Li Zhang, Jie Zhang, and Huafeng Li. "Coupling transesterifications for no- glycerol biodiesel production catalyzed by calcium oxide." Comptes Rendus Chimie 18, No. 12 (2015): 1328-1334.
Ilham, Zul, and Shiro Saka. "Dimethyl carbonate as potential reactant in non-catalytic biodiesel production by supercritical method." Bioresource Technology 100, No. 5 (2009): 1793-1796.
Yanxia, Wang, and Liu Yongqi. "Diesel engine emission improvements by the use of EGM-DMC-Diesel blends fuel." In 5th WSEAS Int. conf. on environment, ecosystems and development, Tenerife, Spain, pp. 14-16. 2007.

(Continued)

*Primary Examiner* — Brian J Davis
(74) *Attorney, Agent, or Firm* — Wood, Phillips, Katz, Clark & Mortimer

(57) ABSTRACT

The present techniques relate to facilitating conversion of biosourced triglycerides into fatty acid esters by combining the biosourced triglycerides with a carbonate ester in presence of an alcohol, under catalytic transesterification conditions. A reaction mixture can be heated to a reaction temperature to operate a transesterification of the biosourced triglyceride with the carbonate ester under catalysis of the alcohol thereby forming a single-phase composition comprising the fatty acid esters. The reaction mixture can have a molar ratio of the biosourced triglyceride over the carbonate ester between 1:0.1 and 1:20. Compositions comprising the produced single-phase composition, and optionally an additive, can be used as diesel, jet fuel or lubricant.

20 Claims, 15 Drawing Sheets

(56) References Cited

OTHER PUBLICATIONS

Celante et al. "Biodiesel production from soybean oil and dimethyl carbonate catalyzed by potassium methoxide", Fuel, Jan. 2018 (2018), vol. 212, pp. 101-107.
Jung et al. Synthesis of fatty acid methyl esters via non-catalytic transesterification of avocado oil with dimethyl carbonate. Energy Conversion and Management, Sep. 1, 2019 (Jan. 9, 2019), vol. 195, pp. 1-6.
Kai et al. "Production of biodiesel fuel from canola oil with dimethyl carbonate using an active sodium methoxide catalyst prepared by crystallization". Bioresource Technology, Jul. 2014 (Jul. 2014), vol. 163, pp. 360-363.
Esan et al. "A review on the recent application of dimethyl carbonate in sustainable biodiesel production". Journal of Cleaner Production, Jun. 1, 2020 (Jun. 1, 2020), vol. 257, pp. 120561.
International Search Report and Written Opinion mailed Feb. 16, 2021 in corresponding PCT Application No. PCT/CA2020/051723.
Deshpande, Shriyash R., Aydin K. Sunol, and George Philippidis. "Status and prospects of supercritical alcohol transesterification for biodiesel production." Wiley Interdisciplinary Reviews: Energy and Environment 6, No. 5 (2017): e252

\* cited by examiner

PROCESS FOR CONVERTING BIOSOURCED TRIGLYCERIDES INTO A SINGLE-PHASE COMPOSITION CONTAINING FATTY ACID ESTER AND RELATED USES AS BIOFUEL OR LUBRICANT

TECHNICAL FIELD

The present techniques generally relate to the production of biosourced single-phase compositions for use as biofuel or lubricant, and more specifically to a transesterification process using catalytic conditions, related system, related reaction mixture, resulting single-phase composition and uses thereof.

BACKGROUND

Several methods are known to produce biofuel candidates including catalytic and non-catalytic transesterification of vegetable oils and animal fats (triglycerides). Catalyzer poisoning, catalyzer separation, catalyzer regeneration, water consumption, reaction time, purification process, robustness to contaminants, solvent recovery, glycerol separation and valorisation are part of the challenges related to biofuel production that can be therefore seen as economically non-competitive.

One known way to reduce complexity and cost associated to recovery of the catalyzer and reduce water consumption is for example the use of alcohol in supercritical conditions during transesterification in absence of catalyzer (Status and prospects of supercritical alcohol transesterification for biodiesel production. S. Deshpande et al. *WIREs Energy Environ* 2017, e252). This technique requires a high molar ratio of alcohol with respect to the triglycerides in order to displace reaction equilibrium in favor of ester formation, which thereby increases production costs related to reaching the reaction temperature and recycling excess alcohol. Dimethyl carbonate (DMC) was alternatively used, instead of an alcohol, as a transesterification agent in supercritical conditions (*Optimization of supercritical dimethyl carbonate method for biodiesel production. Fuel* 97 (2012) 670-677). However, the molar ratio of DMC over triglycerides (e.g. 1:42) remained high and preliminary hydrolysis of the triglycerides was required to obtain a biofuel of better quality. Some neutralization and washing steps can be further needed to remove undesired components (Properties of a potential biofuel obtained from soybean oil by trans methylation with dimethyl carbonate. D. Fabric et al. *Fuel* 86 (2007) 690-697).

Additionally, these two methods produce for example glycerol which corresponds to 10% of the initial mass of the triglycerides. Glycerol is known to be insoluble in fatty acid esters and must be separated from the produced composition in order to use the remaining fatty acid esters as biofuel. Even though glycerol can be valorized, there is not enough demand to match glycerol production. Glycerol derivatization into fuel additive have been proposed (WO2016012343A1) Few methods have been developed to minimize production of glycerol (*Coupling transesterifications for no-glycerol biodiesel production catalyzed by calcium oxide*. Yang. T. Et al. C. R. Chimie 18 (2015) 1328-1334, and *Biodiesel at the Crossroads: A Critical Review*, R. Estevez et al. *Catalysts* 2019, 9, 1033).

There is thus a need for biofuel production techniques that overcome at least some of the challenges that still remain from what is known in the field.

SUMMARY

In one aspect, there is provided a process for the production of a single-phase composition comprising a fatty acid ester, the process comprising:

feeding a reaction mixture comprising a biosourced triglyceride, a carbonate ester and an alcohol to a reaction chamber under a reaction pressure;

heating the reaction mixture to a reaction temperature to operate a transesterification of the biosourced triglyceride with the carbonate ester under catalysis of the alcohol once in the reaction chamber, thereby forming the single-phase composition comprising the fatty acid ester; and recovering the single-phase composition from the reaction chamber.

In another aspect, there is provided a reaction mixture to produce a single-phase composition comprising a fatty acid ester via catalytic transesterification, the reaction mixture comprising:

a biosourced triglyceride of formula I:

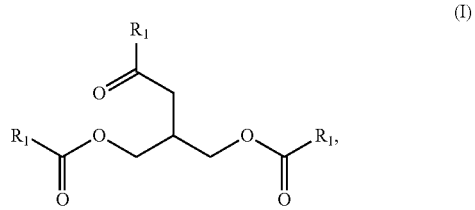

a carbonate ester of formula II:

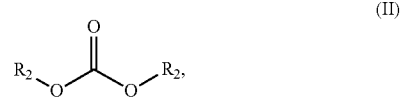

an alcohol of formula III:

wherein $R_1$ is a functional derived from a fatty acid which nature can differ from one $R_1$ to another $R_1$ of the triglyceride; and $R_2$ and $R_3$ are alkyl or aryl groups.

wherein a molar ratio of the biosourced triglyceride over the carbonate ester between 1:0.1 and 1:20; and wherein the alcohol is present in a catalytic amount to maximize conversion of the biosourced triglyceride into the fatty acid ester.

In another aspect, there is provided a single-phase composition comprising a fatty acid ester and produced by the process as defined herein. The single-phase composition can also be defined as the product of transesterification of the reaction mixture as defined herein. The single-phase composition can include the following compounds, in proportions depending from the process conditions that were applied:

the biosourced triglyceride of formula I:

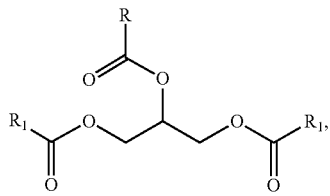

the carbonate ester of formula II:

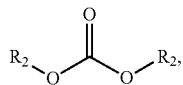

the alcohol of formula III:

a fatty acid ester of formula IV:

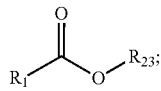

and wherein $R_1$ is a functional derived from a fatty acid which nature can differ from one $R_1$ to another $R_1$ of the triglyceride; and each of $R_2$ and $R_3$ can be an alkyl group, an aryl group or a glycerol carbonate derivative.

lipophilic glycerol derivatives of formula V:

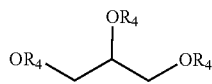

wherein $R_4$ can be a cyclic carbonate, an alkyl carbonate, an aryl carbonate, fatty acyl moieties, and where each $R_4$ can be different from one another.

Optionally, the single-phase composition can further include lipophilic glycerol derivatives that are formed by the rearrangement or decomposition of lipophilic glycerol derivatives of formula V.

It should be noted that the single-phase composition as defined herein can be used as a biofuel, a lubricant, as a biocomponent of a jet fuel, as a biocomponent of a diesel fuel, as a biocomponent of a lubricant. The single-phase composition can further be part of a composition that further comprises an additive selected for diesel, jet fuel or lubricant application.

In another aspect, there is provided a method to maximize conversion of biosourced triglycerides into fatty acid esters. The method includes:

combining the biosourced triglycerides with a carbonate ester in presence of an alcohol, under catalytic transesterification conditions, wherein the molar ratio of the biosourced triglyceride over the carbonate ester is between 1:0.1 and 1:20 and the molar ratio of the biosourced triglyceride over the alcohol is between 1:0.01 and 1:0.5.

In yet another aspect, there is provided a system to produce a single-phase composition as defined herein, the system comprising:

a reaction unit for receiving the reaction mixture comprising the biosourced triglyceride, the carbonate ester and the alcohol;

a heating assembly configured to heat the reaction mixture to the reaction temperature;

a pumping assembly configured to provide the reaction mixture at a reaction stoichiometry to the reaction unit; and a cooling assembly receiving and cooling the formed single-phase composition at ambient temperature.

While the invention will be described in conjunction with example embodiments, it will be understood that it is not intended to limit the scope of the invention to such embodiments. On the contrary, it is intended to cover all alternatives, modifications and equivalents as may be included as defined by the present description. The objects, advantages and other features of the present invention will become more apparent and be better understood upon reading of the following non-restrictive description of the invention, given with reference to the accompanying drawings.

BRIEF DESCRIPTION OF THE DRAWINGS

Implementations of the techniques described herein are represented in and will be further understood in connection with the following figures.

Figure 1:
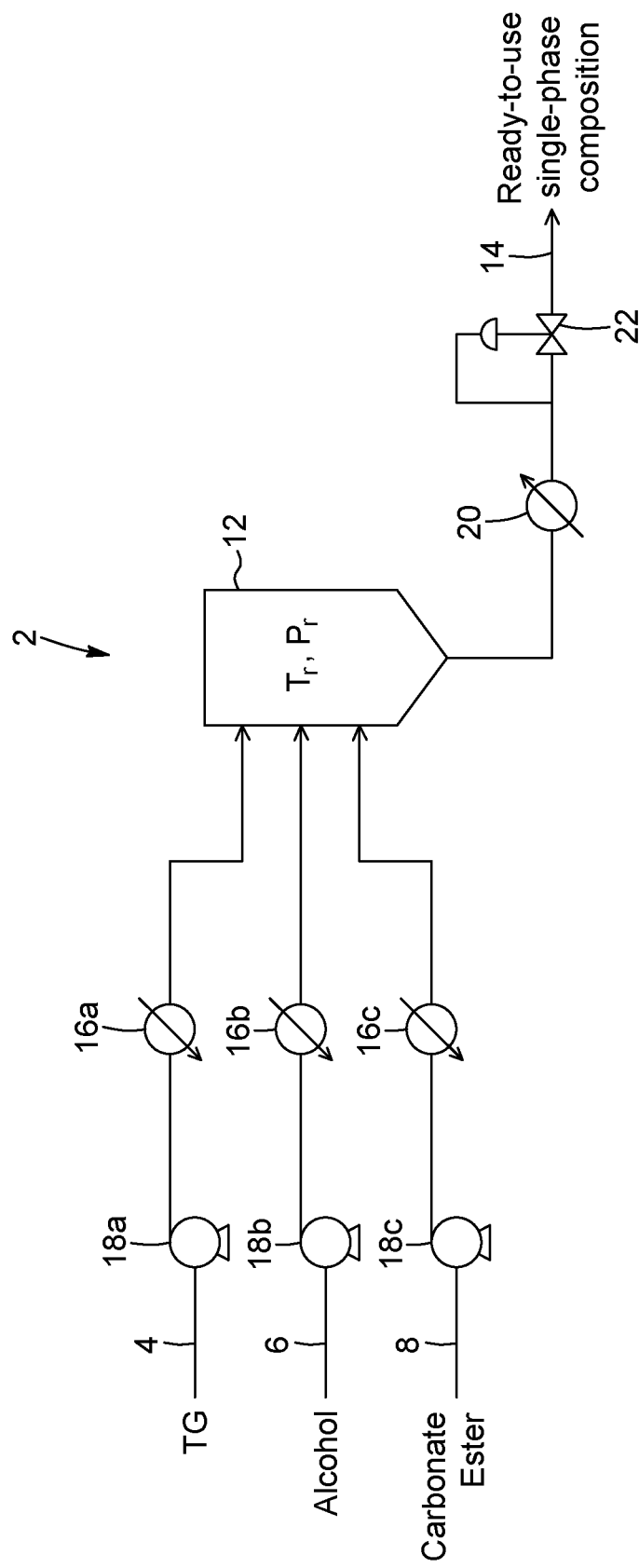
FIG. 1 is a schematic bloc diagram of a system operating a process for producing a single-phase composition as contemplated herein.

While the invention will be described in conjunction with example embodiments, it will be understood that it is not intended to limit the scope of the invention to these embodiments. On the contrary, it is intended to cover all alternatives, modifications and equivalents as may be included as defined by the appended claims.

DETAILED DESCRIPTION

The techniques described herein relate to the formation of a single-phase composition that can be directly used as a biofuel, a lubricant, or as a biocomponent of jet fuel, diesel or lubricant. The single-phase composition is produced according to a transesterification process allowing conversion of a biosourced triglyceride into a fatty acid alkyl ester and lipophilic glycerol derivatives of interest for the above-detailed applications. The nature of the components of the single-phase composition, and their proportions therein, can vary upon controlling the nature of the reactants and the process conditions in order to obtain single-phase compositions having physicochemical properties that are tailored to the end application. The process as described herein can be described as a no-waste process, making use of 100% of the reaction products as the single-phase composition, that does not necessitate any component recovery, that can use fully biosourced intrants and be fully automated to be operated in continuous mode.

More specifically, it has been found that contacting a biosourced triglyceride with a carbonate ester and alcohol, as a catalyst, lead to the conversion of the reaction mixture into fatty acid alkyl ester and lipophilic glycerol derivatives, thereby forming a single-phase composition that can be directly used for the applications contemplated herein. Advantageously, such conversion can be operated in a dedicated micro-plant receiving animal or vegetal biomass that is generated on-site (e.g. in a farm harvesting seeds or growing animals).

Reaction Mixture Implementations

The reaction mixture is defined as a mixture of reactants and catalyst selected to form the single-phase composition upon performing a transesterification reaction between the reactants in presence of the catalyst. The reaction mixture includes a biosourced triglyceride of formula I, a carbonate ester of formula II, and an alcohol of formula III.

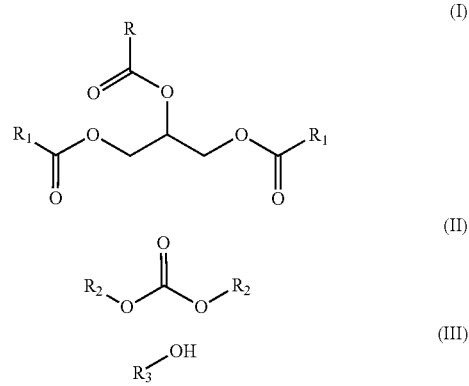

$R_1$ is a functional group from the fatty acid acyl group derived from a vegetal oil or an animal fat. The carbon chain length of the acyl group can vary and can usually contain 8 to 26 carbon atoms depending on the naturally occurring fatty acid. Formula (I) illustrates an homotriglyceride but it should be noted that $R_1$ groups could vary from one another in the same triglyceride of the reaction mixture.

$R_2$ can be an alkyl or aryl group, such as a phenol, and can contain heteroatoms such as nitrogen, sulfur or oxygen, for example. It should be note that each $R_2$ can be different from one another on the same carbonate ester.

$R_3$ can be an alkyl or aryl group, such as a phenol, and can contain heteroatoms such as nitrogen, sulfur or oxygen, for example.

$R_2$ and $R_3$ can be the same group or different groups.

It should be noted that the triglyceride as contemplated herein is considered as biosourced, i.e. found in a vegetal or animal source. In case of triglycerides, the vegetal source can be a vegetal oil or a combination of vegetal oils. Vegetal oils of interest in the production of biofuel include soybean oil, canola seed oil, sunflower seed oil, corn germ oil, olive oil, cotton seed oil, rapeseed oil, linen seed oil, algae oil, coconut oil, pistachio oil, jatropha oil, any other fruit oils, waste vegetal oils (WVO) or any combinations thereof. Animal sources for triglycerides include animal fat or a combination of animal fats. Animal fats of interest in the production of biofuel include beef tallow, pork lard, and chicken fat. Biosourced triglycerides constituting the vegetal oils and animal fats, also known as triacylglycerol, include triglycerides where the acyl group can be saturated (i.e. Caprylic acyl, Capric acyl, Lauric acyl, Stearic acyl, Arachidic acyl, Behenic acyl, Lignoceric acyl, Cerotic acyl, etc.) or can be unsaturated (i.e. Myristoleic acyl, Palmitoleic acyl, Sapienic acyl, Oleic acyl, Elaidic acyl, Vaccenic acyl, Lenoleic acyl, Linoeleaidic acyl, Arachidonic acyl, Eicosapentaenoic acyl, Erucic acyl, Docosahexaenoic acyl, etc.).

The carbonate ester present in the reaction mixture is selected to serve as a transesterification agent interacting with both acyl group and glycerol group of the triglyceride. The carbonate ester also serves as a water trapping agent and free fatty acid trapping agent thus allowing water or free fatty acid contamination of the biosourced triglyceride. The carbonate ester can be a dialkyl or diaryl carbonate. For example, the carbonate ester can be dimethyl carbonate, diethyl carbonate, diisopropyl carbonate, di-n-butyl carbonate, Di-iso-butyl carbonate, diphenyl carbonate, dibenzyl carbonate, di-para-tolyl carbonate, or dimethylphenyl carbonate. When referring to the carbonate ester of the reaction mixture, one should understand that the reaction mixture can include a blend of carbonate esters.

The alcohol is present in the reaction mixture as a proton source and serves as homogeneous catalyst of the transesterification reaction. The alcohol can be an alkyl alcohol or an aryl alcohol. For example, the alkyl alcohol can be methanol, ethanol, isopropanol, n-propanol, n-butanol, isobutanol or glycerol. In another example, the aryl alcohol can be a benzyl alcohol, a phenol, para-tolyl alcohol or para-methyl phenol. When referring to the alcohol of the reaction mixture, one should understand that the reaction mixture can include a blend of alcohols.

It should be noted that the reaction mixture can be prepared by mixing animal fat or vegetal oil with the remaining components including the carbonate ester and the alcohol. Therefore, when referring to the triglyceride of the reaction mixture, one should understand that the reaction mixture can include a blend of triglycerides, depending on the vegetal oil or animal fat that are used. For example, waste vegetable oil can consist of several triglycerides. A combination of different vegetable oils and/or animal fats in tailored proportions can be used to modulate the physicochemical properties of the single-phase composition produced by the process.

The combination of an alcohol as a homogenous catalyst and a carbonate ester as a transesterification agent allows for a decreased molar ratio of transesterification agent with respect to the triglycerides, in comparison to known and conventional reaction mixtures involving use of carbonate esters or alkyl alcohol (separately). In some implementations, the molar ratio of the biosourced triglyceride over the carbonate ester can be between 1:0.1 and 1:20.

In addition, the alcohol, serving as homogeneous catalyst, can be present in a catalytic amount. This catalytic amount is to be understood as an amount advantageously avoiding removal of the catalyst (alcohol) from the single-phase composition, after reaction, before further use in respect with the physicochemical properties needed. The combination of the alcohol and the carbonate ester favors the transformation of glycerol into lipophilic glycerol derivatives that are soluble such that the resulting single-phase composition is suitable to be used as/in fuel or lubricant. Glycerol formation is thereby prevented, or at least reduced. The catalytic presence of alcohol can also contribute to maximize conversion of the biosourced triglyceride into fatty acid alkyl ester. In some implementations, the molar ratio of the biosourced triglyceride over the alcohol can be between 1:0.01 and 1:0.5.

In other implementations, the reaction mixture can include a mixture of dialkyl carbonates or diaryl carbonates. For example, a 1:1 ratio of dimethyl carbonate and diethyl carbonate can be part of the reaction mixture.

In some implementations, the reaction mixture can further include an antioxidant in association with the biosourced triglyceride, such as 2,6-di-tert-butyl-4-methylphenol (BHT), or tert-butylhydroquinone (TBHQ), Pyrogallol (PY), Butylated hydroanisole (BHA). The use of an antioxidant, optionally between 10 and 10 000 ppm, can be advised when the selected triglyceride is known to be less thermally stable, such that the use of the antioxidant can be beneficial for the thermal stability of the produced single-phase composition.

Process and System Implementations

There is provided herein a process making use of the reaction mixture described herein by allowing conversion of the reaction mixture into a single-phase composition being tailored for use as biofuel or lubricant. The process includes subjecting the triglyceride of the reaction mixture to catalyzed transesterification under process conditions (temperature, pressure and reaction time) that are tailored to obtain a single phase composition, the latter having physicochemical properties suitable for its use as a whole for biofuel or lubricant, or in a blend with diesel, jet-fuel or lubricant. There is further provided a system to operate such process at different scales, including directly in a facility where biomass is generated.

It should be noted that the process can include preparing the reaction mixture by pre-mixing the alcohol and the carbonate ester to form a pre-mixture, before mixing thereof with the remaining components of the reaction mixture. Other specific components of the reaction mixture could be premixed together. For example, when the reaction mixture includes an antioxidant, the antioxidant can be premixed with the triglyceride, and e.g. can already be found in a vegetal oil. Alternatively, all components of the reaction mixture can be simultaneously mixed together.

Figure 2:
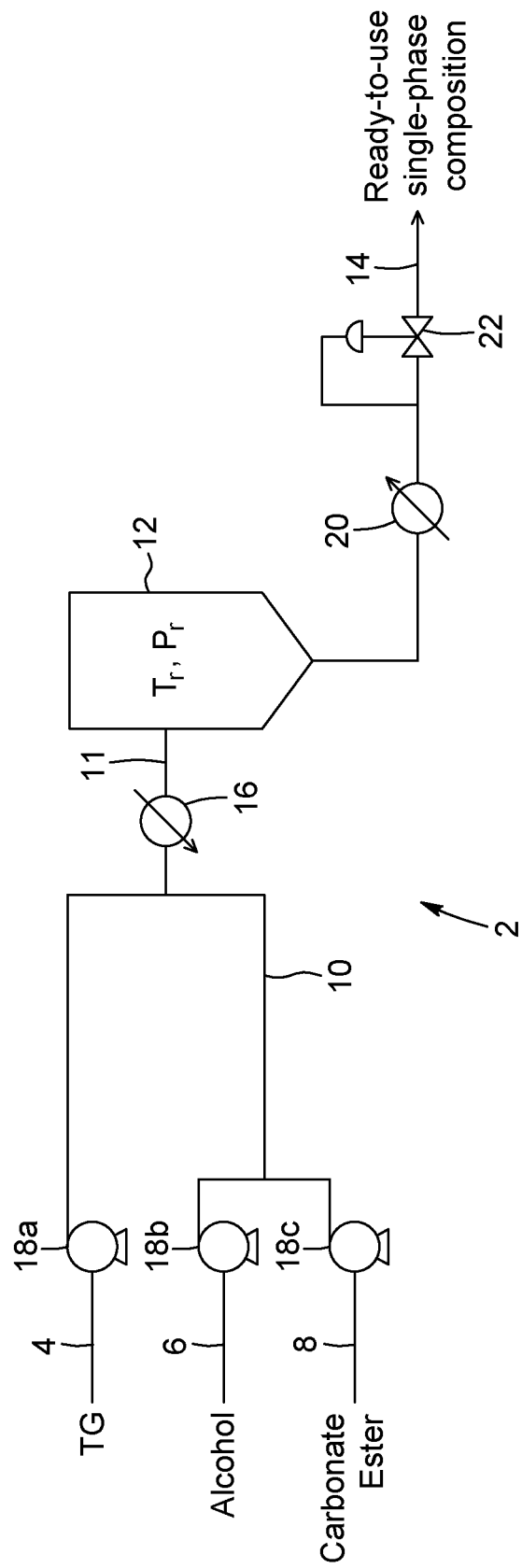
FIG. 2 is a schematic bloc diagram of another system operating a process for producing a single-phase composition as contemplated herein.
Figure 3:
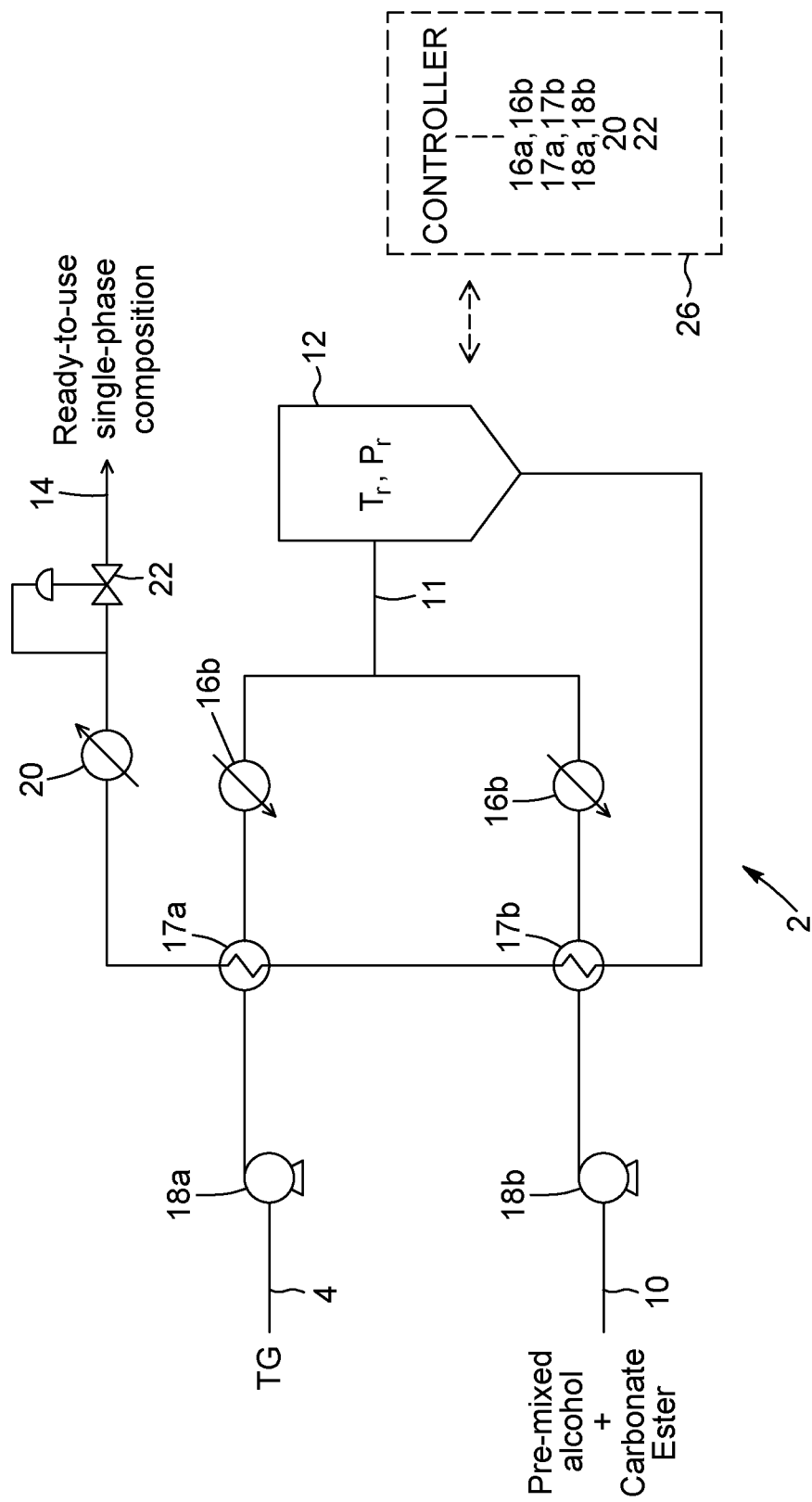
FIG. 3 is a schematic bloc diagram of another system operating a process for producing a single-phase composition as contemplated herein.

FIGS. 1 to 3 illustrate examples of a system that can be used to prepare the reaction mixture and operate the transesterification reaction in order to produce the single-phase composition. Referring to FIG. 1, the system 2 can include independent triglyceride feedline 4, alcohol feedline 6 and carbonate ester feedline 8 in fluid communication with a source of each component (that can be a feed tank for example, not illustrated). It should be noted that each feed tank can be kept under an inert atmosphere using an inert gas such as argon or nitrogen. Referring to FIG. 2, the alcohol feedline 6 and the carbonate ester feedline 8 can be premixed to feed a pre-mixture feedline 10, independent from the triglyceride feedline 4. One skilled in the art will readily understand that the system can include as many feedlines as the number of components forming the reaction mixture (see FIG. 1). However, the number of feedlines can be reduced by premixing some of the components (see FIGS. 2 and 3).

It should be noted that premixing one or more components of the reaction mixture can allow reducing the number of high-pressure liquid pumps to be used in a system for operating the process, thereby reducing the operating cost of the process. Referring to FIGS. 1 to 3, the system 2 further includes a pumping assembly including one or more pumps (18*a*, 18*b*, 18*c*), e.g. high pressure pumps, operatively connected to the respective feedlines 4, 6, 8 or 10, so as to provide suitable stoichiometric proportions within the ranges described herein.

Again, various ways of feeding the reaction mixture to a reaction unit for operating the transesterification reaction are contemplated. For example, as seen on FIG. 1, components of the reaction mixture can be independently fed to a reaction unit 12 via feedlines 4, 6 and 8, to operate the transesterification reaction at a reaction temperature Tr and a reaction pressure Pr. FIGS. 2 and 3 show an example of a system 2 where the components are combined to form the reaction mixture, before the reaction mixture is fed to the reaction unit 12 via feedline 11.

Referring to FIG. 1, the reaction unit 12 can include multiple inlets, each inlet being in fluid communication one of the feedlines 4, 6 and 8, such that the reaction mixture is formed within the reaction unit 12 itself at the reaction temperature Tr and reaction pressure Pr. Though not illustrated in the Figures, it should be noted that the reaction unit can include multiple reaction chambers to operate the transesterification at different sets of reaction conditions, such that the resulting single-phase composition can have tailored physicochemical properties. In some implementations, the reaction unit or reaction chamber is a tubular reactor, a batch reactor, or a microfluidic reactor.

It should be noted that FIGS. 1 to 3 illustrate implementations of the process including feeding the reaction mixture continuously, such that the single-phase composition is recovered from the reaction chamber as a continuous process stream 14. However, one skilled in the art can readily understand how to adapt such system to a batch process also contemplated herein.

The process further includes subjecting the reaction mixture to a combination of temperature and pressure tailored to converting the triglyceride into specific proportions of fatty acid ester and lipophilic glycerol derivatives, while maintaining homogeneity of the composition (single-phase). Indeed, the combination of reaction temperature and reaction pressure is selected to ensure that the catalytic transesterification is operated in a homogeneous medium. Subcritical or supercritical conditions can be used to that effect. It should particularly be noted that the reaction temperature and pressure conditions can be a combination of a subcritical temperature and subcritical pressure placing a compound or the mixture of compounds below a critical point. Alternatively, the reaction temperature and pressure conditions can be a combination of a supercritical temperature and supercritical pressure placing a compound, e.g. the carbonate ester, or a mixture of compounds at or above a critical point, wherein a compound or the mixture of compounds becomes a supercritical fluid. In some implementations, the temperature can be between 50° C. and 500° C., and the pressure can be between 13 and 5000 psi.

Various ways of subjecting the reaction mixture to a combination of temperature and pressure are contemplated. For example, the process can include independently preheating the components of the reaction mixture (see FIG. 1), independently the triglyceride TG (vegetal oil and/or animal fat) and the pre-mixture of alcohol and carbonate ester (see FIG. 3), or pre-heating the formed reaction mixture itself (see FIG. 2) before mixing thereof to form the reaction mixture. Additionally, as seen in FIG. 3, subjecting the reaction mixture to a reaction temperature can be done in two pre-heating steps. Referring to FIG. 3, the system 2 can include a heating assembly (16a, 16b, 17a, 17b) configured to independently heat the triglycerides via a heating device 16a operatively connected to feedline 4, and the pre-mixture of alcohol and carbonate ester via a another heating device 16b operatively connected to feedline 10, before being fed to the reaction unit 12. Advantageously, the thermal energy to be provided by the heating devices 16a and 16b can be reduced by further pre-heating the fluids flowing via feedlines 4 and 10 via energy recovered from the single-phase composition. Indeed, the heating assembly can include a pair of heat exchangers 17a and 17b, providing thermal energy to the feedlines 4 and 10 from the produced single-phase composition via line 14, assisting in the cooling thereof. Optionally, the reaction unit 12 can be equipped with an independent heating device (not illustrated) to maintain the reaction temperature during the entire reaction time within the reaction unit 12. The system 2 can further include a back-pressure valve 22 configured to maintain the reaction pressure in the reaction unit 12 provided by the high-pressure pumps 18a and 18b.

It should be noted that the heating devices encompassed herein as those available to one skilled in the art including an indirect heat exchanger, an electric heater, an oil bath, an air heater, an infra-red heater and a radio-frequency heater.

The process further includes operating the catalytic transesterification of the reaction mixture to produce the single-phase composition comprising at least fatty acid esters suitable for use as biofuel or lubricant. The combined presence of carbonate ester as transesterification agent and alcohol as catalyst, allows formation of a single-phase composition for which the potentially formed glycerol, monoglyceride, and diglyceride are trapped by the carbonate ester under catalysis of the alcohol (acting as a proton source), to form lipophilic and soluble derivatives. In contrast, typical transesterification methods, that do not benefit from the combined presence of alcohol and carbonate ester, can produce a multiple-phase composition including untrapped glycerol (free) and solid components (such as glycerol sodium salt) which have to be removed via subsequent separation/extraction steps.

It should be noted that the specifications of certain single-phase composition to be formed may necessitate an incomplete reaction. Lubricant specifications may be one of them. Via the present techniques, conversion of the biosourced triglyceride into the fatty acid esters can be at least 10%, at least 20%, at least 30%, at least 40%, at least 50%, at least 60%, at least 70%, at least 80% or at least 90%. In addition, glycerol, if present, is in negligible amount. In some implementations, complete conversion of the triglyceride into fatty acid esters can be obtained. In some implementations, complete conversion of triglycerides into fatty acid esters can be obtained with a reaction time between 0.1 and 120 minutes.

In some implementations, the process can include adjusting at least one of the reaction conditions (including the amount or nature of biosourced triglyceride, the amount or nature of carbonate ester, the amount or nature of alcohol, the reaction temperature, the reaction pressure, the preheating temperature, reaction time in the reaction unit, number of reaction chambers) to vary a stoichiometry of the transesterification and obtain a single-phase composition having tailored physicochemical properties. The process can for example include selecting reaction conditions maximizing an amount of fatty acid esters or an amount of a particular fatty acid ester to be formed within the single-phase composition.

It should further be noted that additional equipment such as valves, thermocouples, micro-vibrator, inline analytical system, such as infrared analytic system, filtration system, etc. can be included in the system to ensure automation, operation, security, control of the process and maintenance of the system. As an example, explosion proof micro-vibrators can be used at different locations of the feedlines, inlets and outlets of the system to prevent clogging in the extreme tested conditions.

Referring to FIG. 3, the system 2 can further include a controller 26 operatively connected to the pumping assembly, heating assembly and additional equipment, such as thermocouples (not illustrated) in the reaction unit 12, to adjust at least one of the above-mentioned reaction parameters.

In some implementations, the system can further include a monitoring assembly operatively connected to the controller to provide analytical data thereto. The controller can actuate one or more of the assemblies and elements of the system in response to the monitored analytic data, to ensure that the produced single-phase composition meet the desired specifications. The monitoring assembly can include in-line analytic systems such as, but not limited to, NIR probes, UV apparatus, Raman apparatus, NMR apparatus, and MS apparatus. It should be noted that the monitoring of the composition of the fluids flowing in the feedlines can alternatively be performed via sampling and subsequent analysis of the sample in laboratory.

The process can further include cooling the single-phase composition to ambient temperature before recovery thereof. Referring to FIG. 3, the single-phase composition can be pre-cooled by providing thermal energy to pre-heat the components fed to the reaction unit via heat exchangers 17a and 17b. The system 2 can further include a cooling device 20 operatively connected to the product stream line 14 and performing cooling of the single-phase composition for recovery thereof.

The process reactions conditions can therefore be controlled to form a single-phase composition and eliminate the need for prior saponification, prior acidic esterification or subsequent removal of solvent, catalyst (unreacted) or non-biofuel-like components from the formed single-phase composition.

Figure 4:
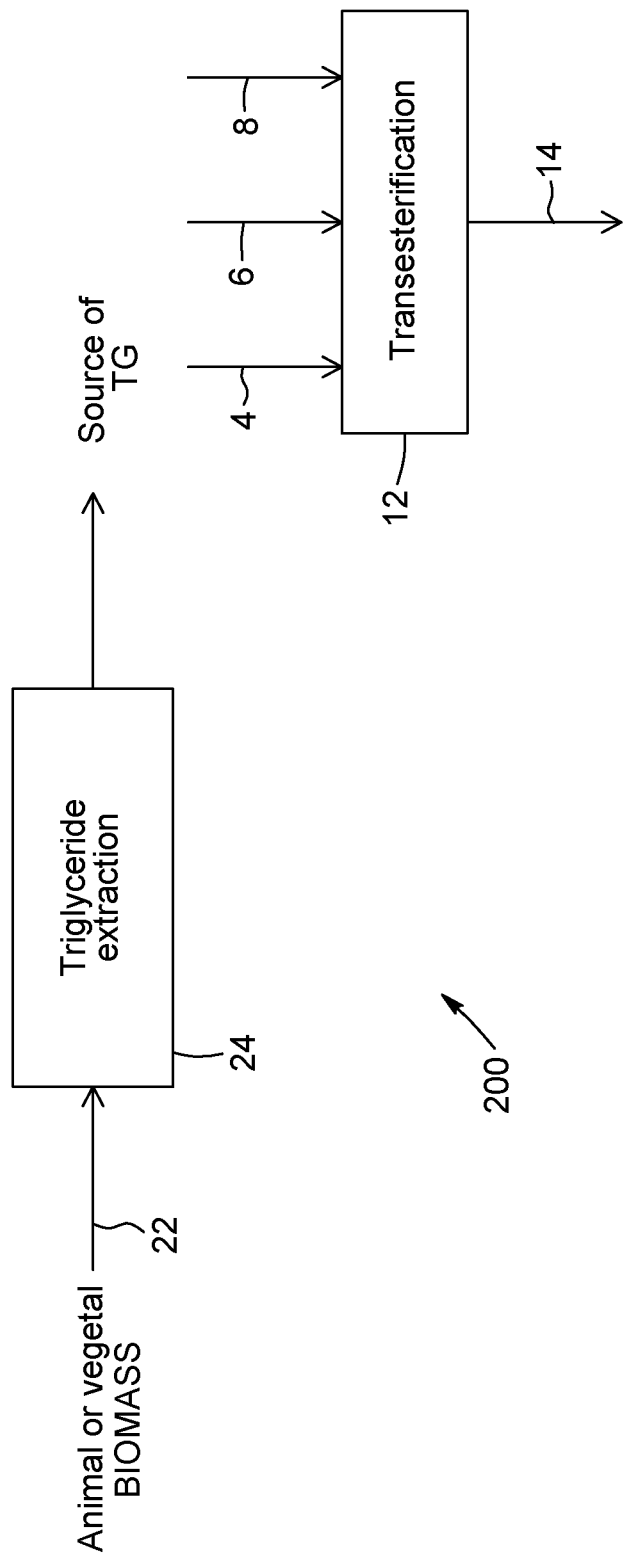
FIG. 4 is a schematic process flow diagram of a process for producing a single-phase composition as contemplated herein.
Figure 5:
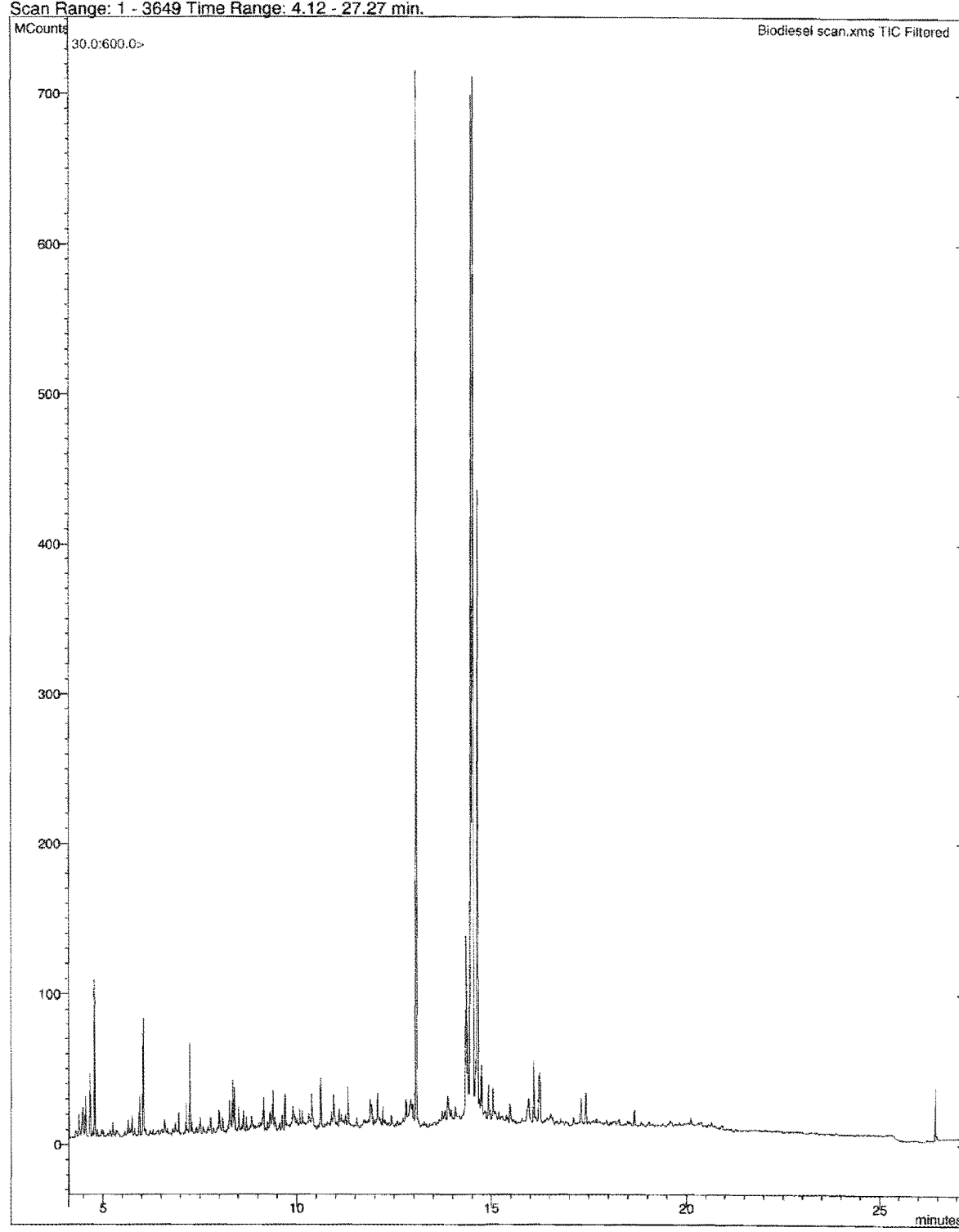
FIGS. 5 to 15 provide graphs of external Gas Chromatography-Mass Spectrometry (GCMS) analysis of a sample of a single-phase composition obtained in Example 3.
Figure 6:
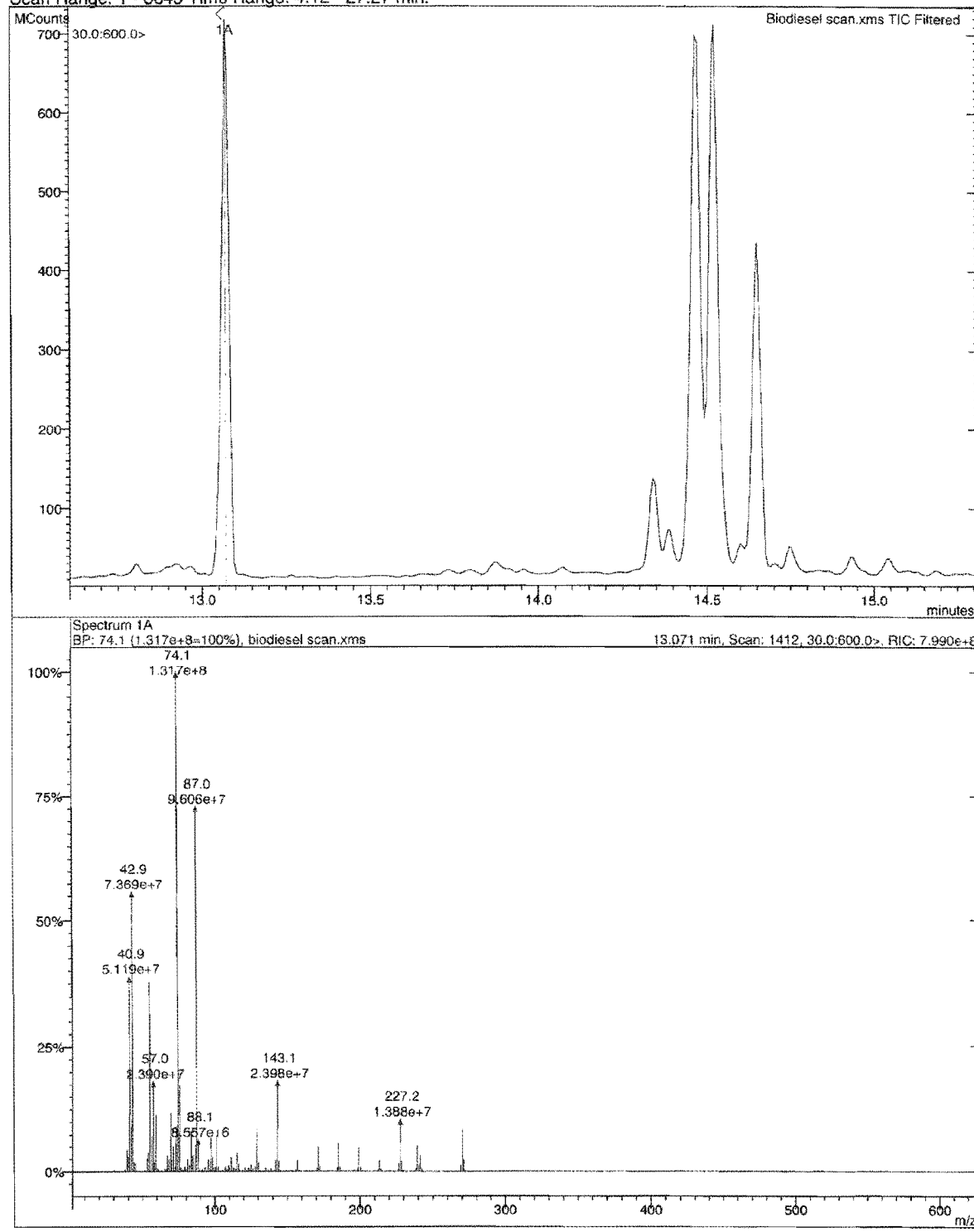
Figure 7:
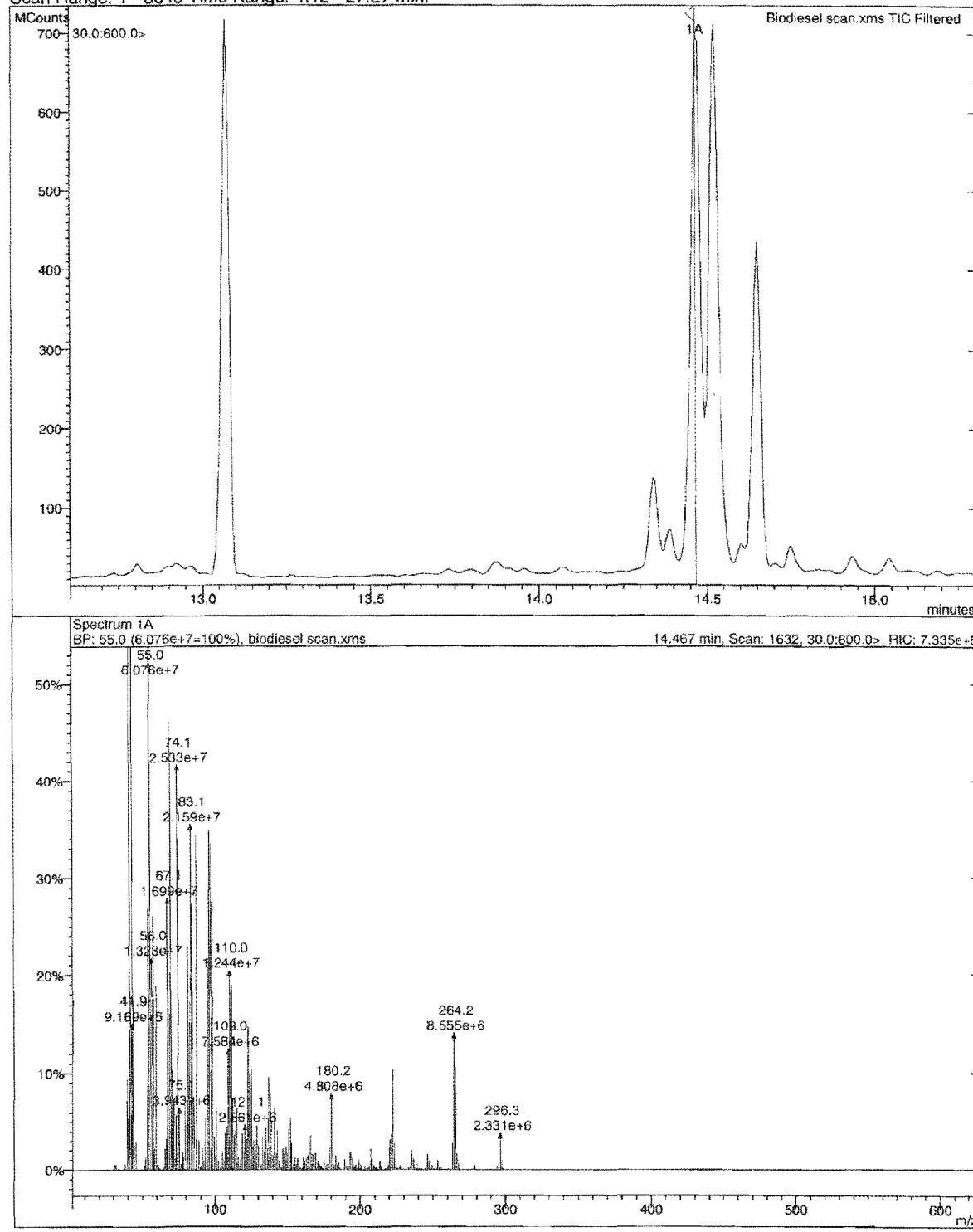
Figure 8:
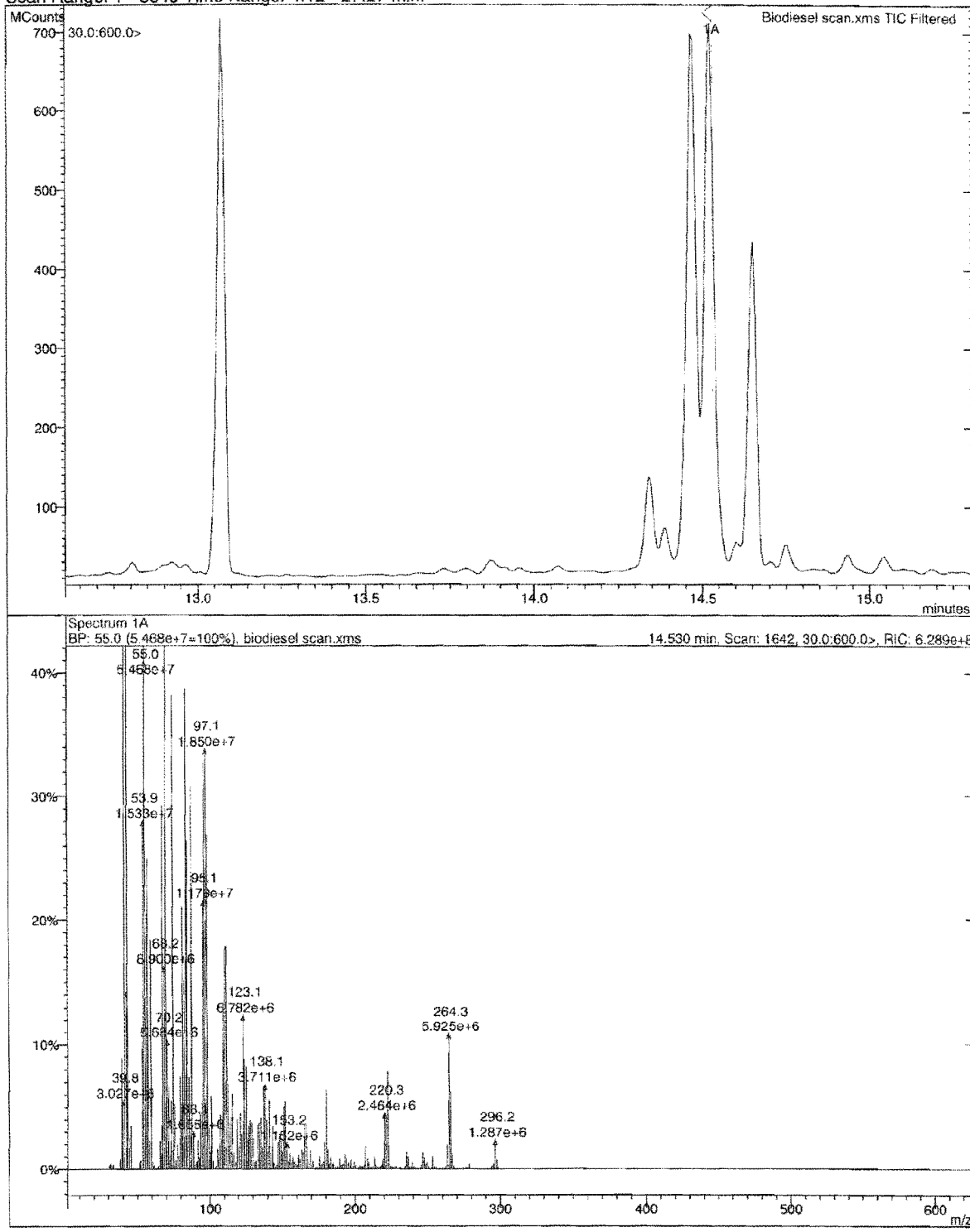
Figure 9:
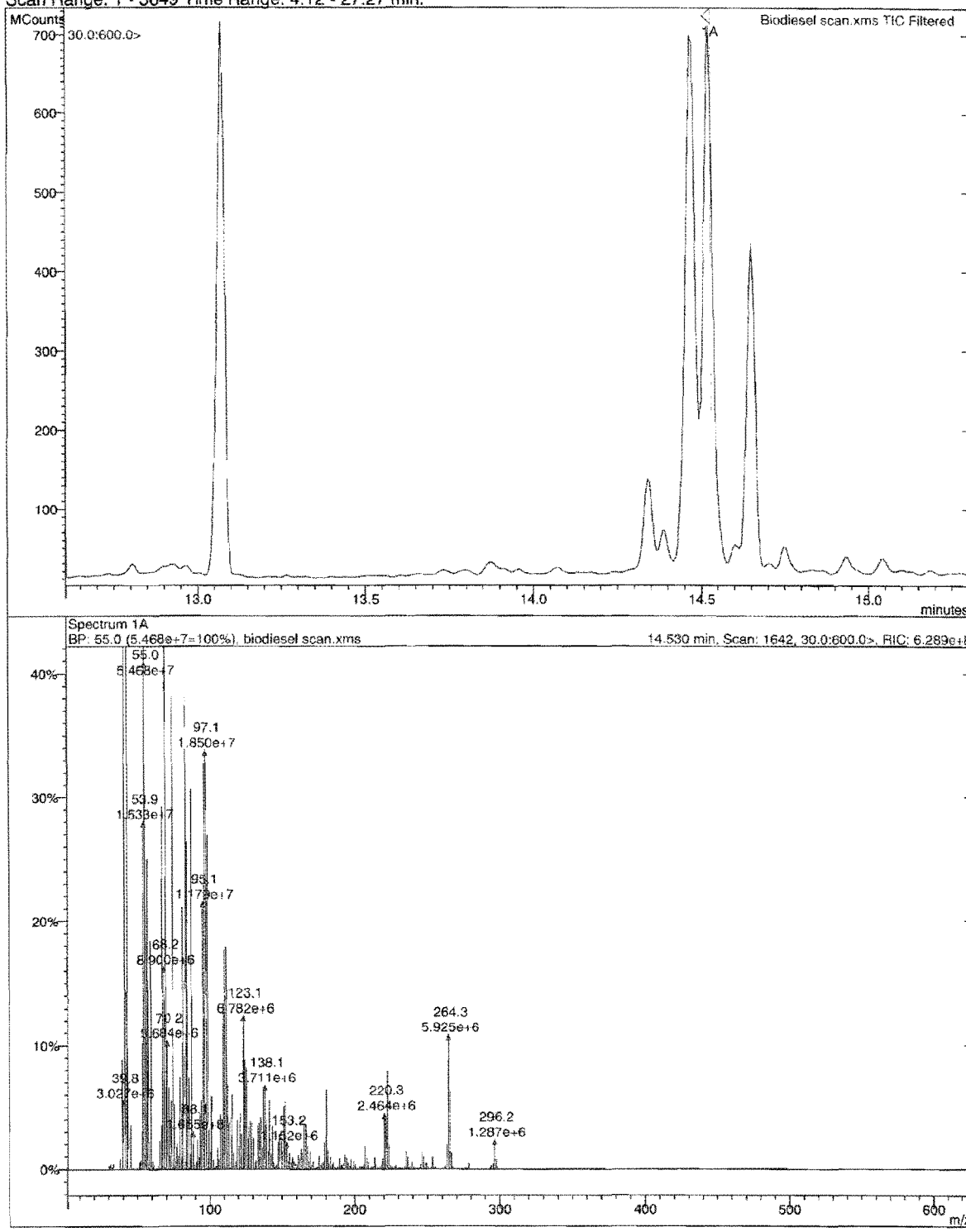
Figure 10:
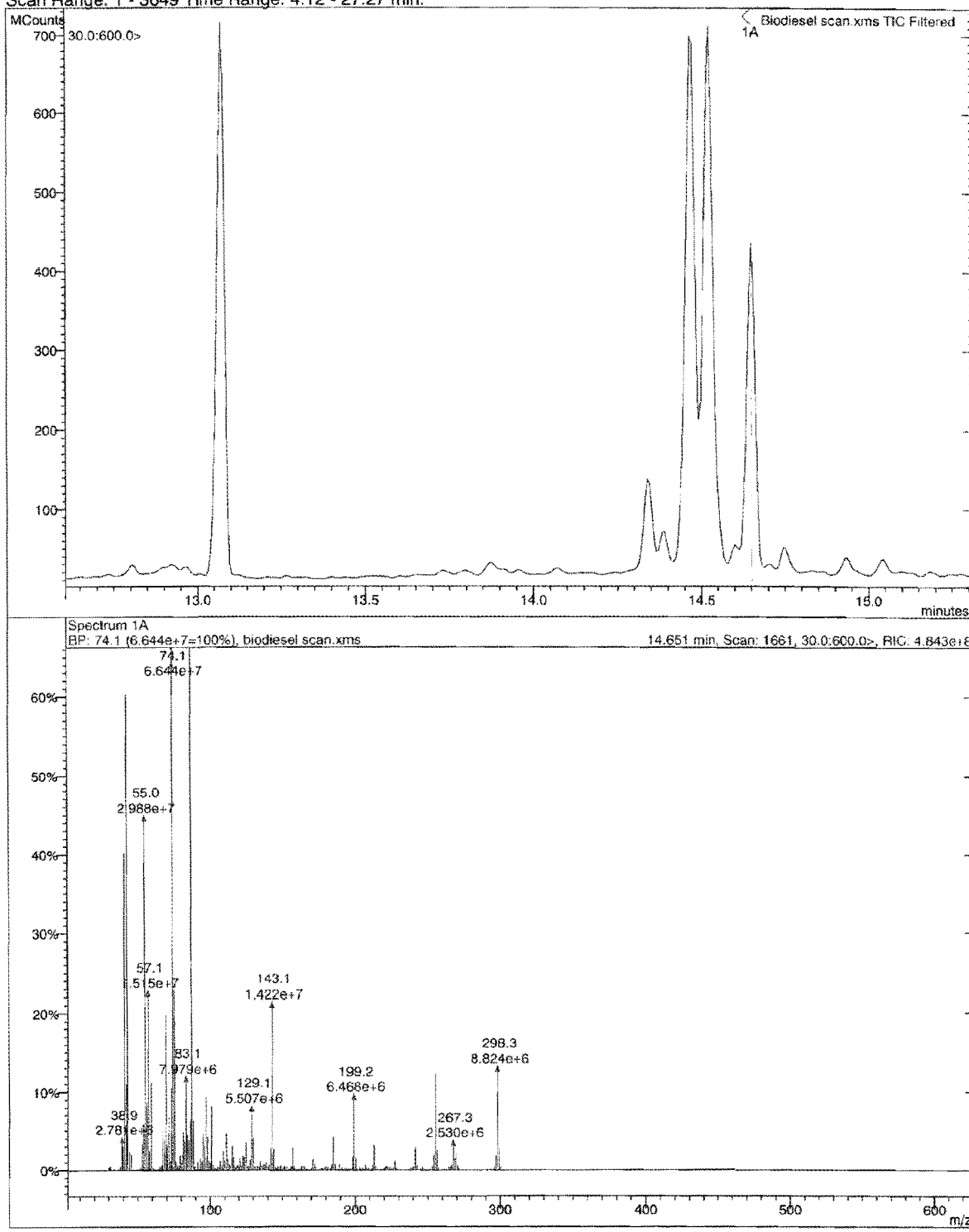
Figure 11:
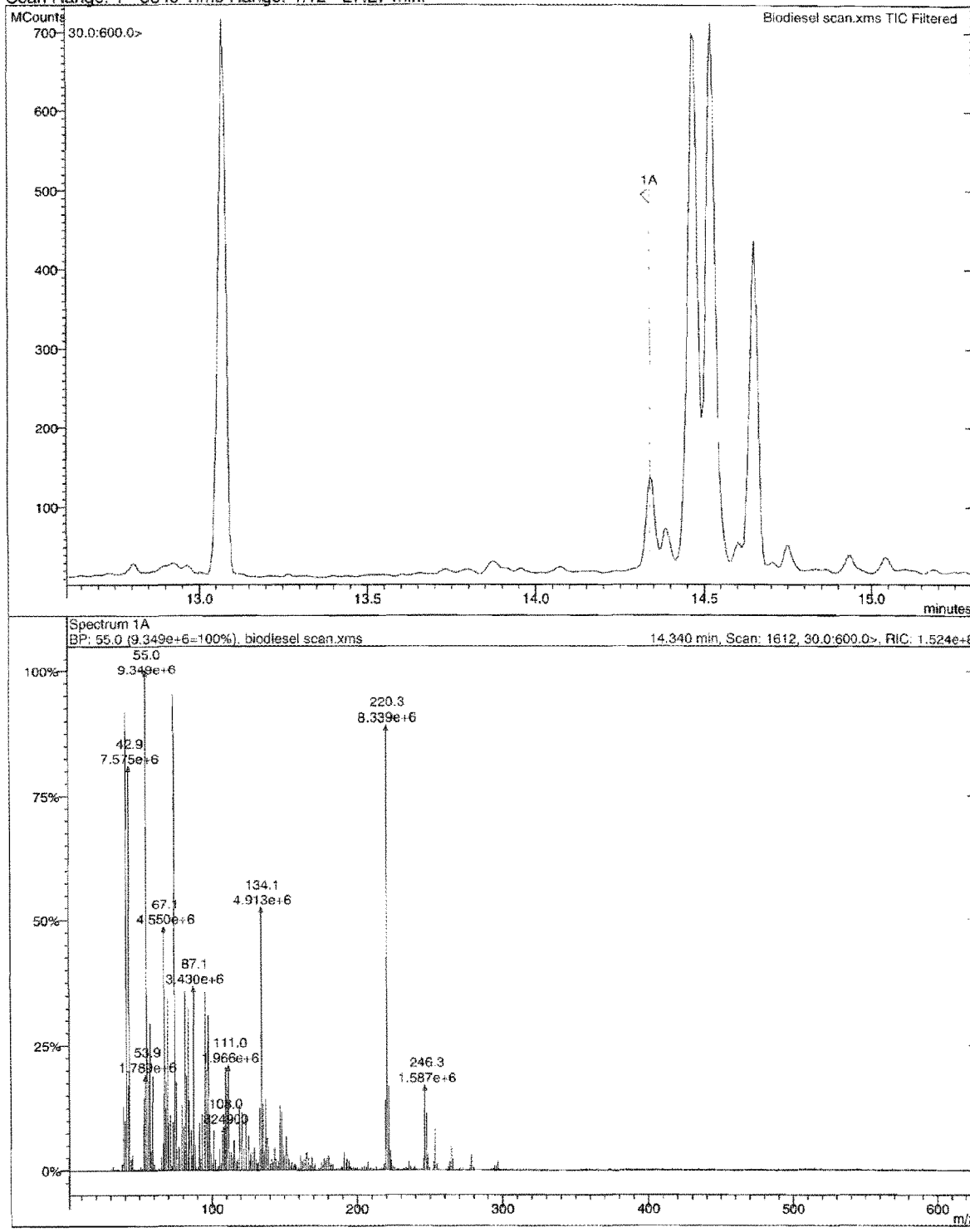
Figure 12:
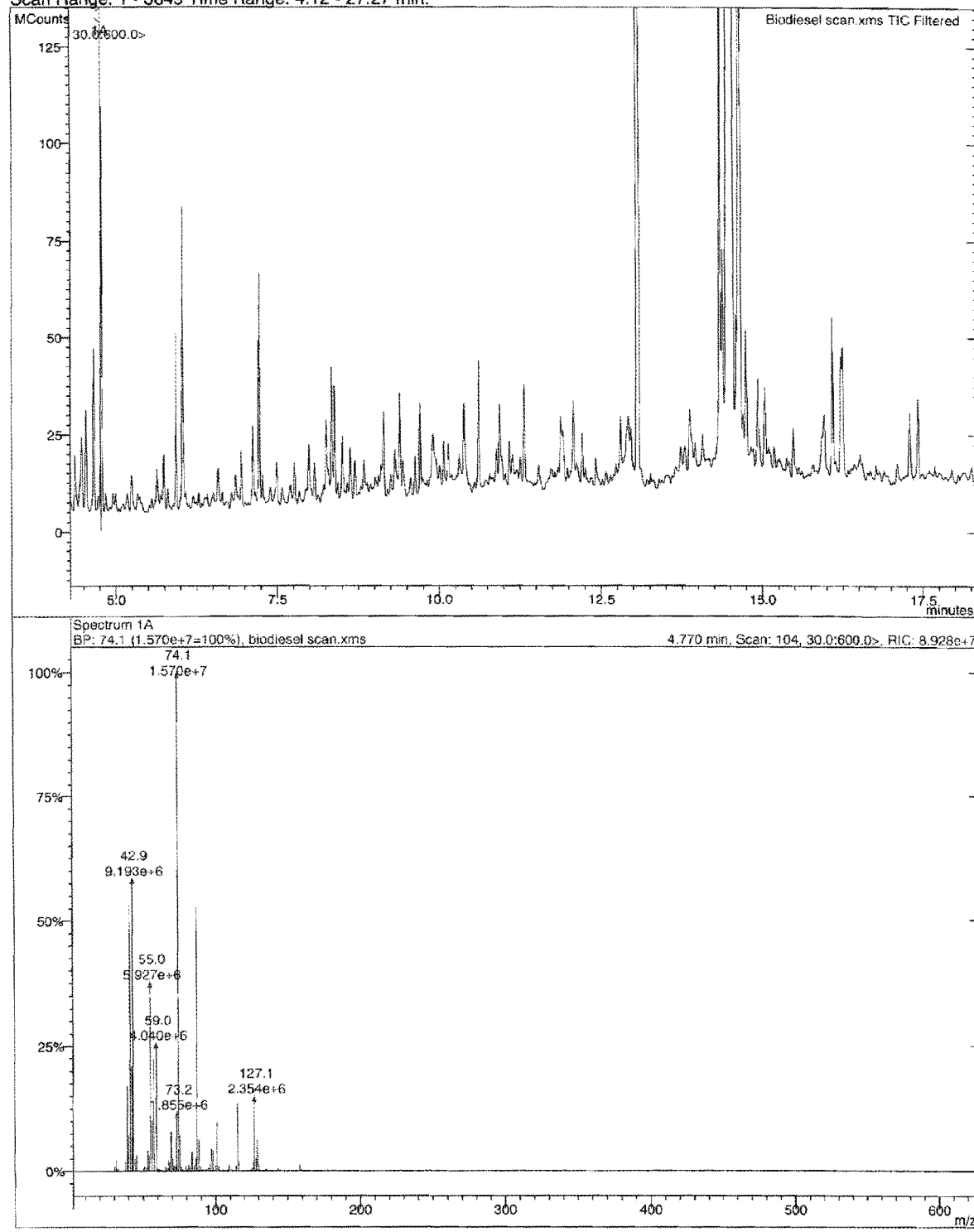
Figure 13:
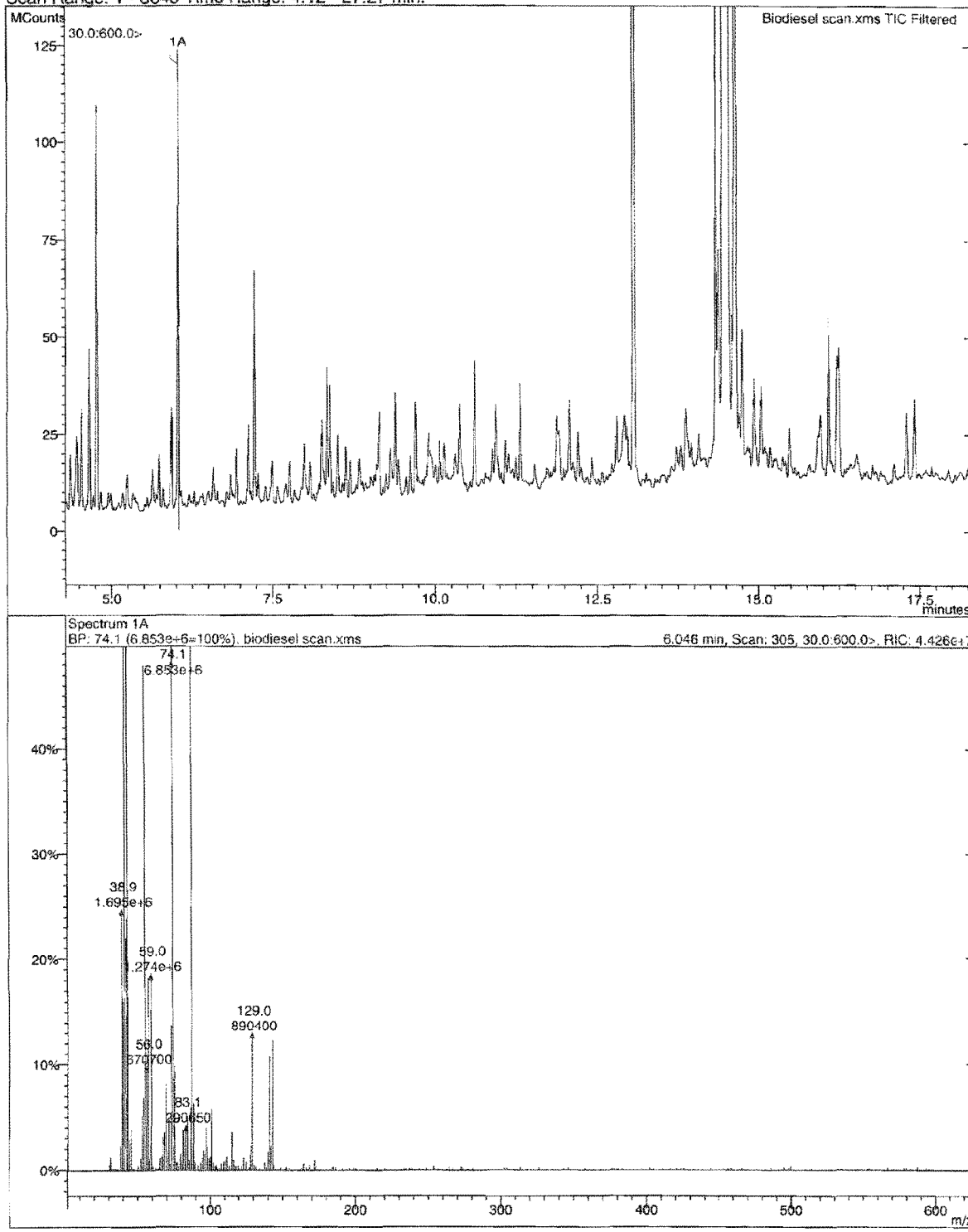
Figure 14:
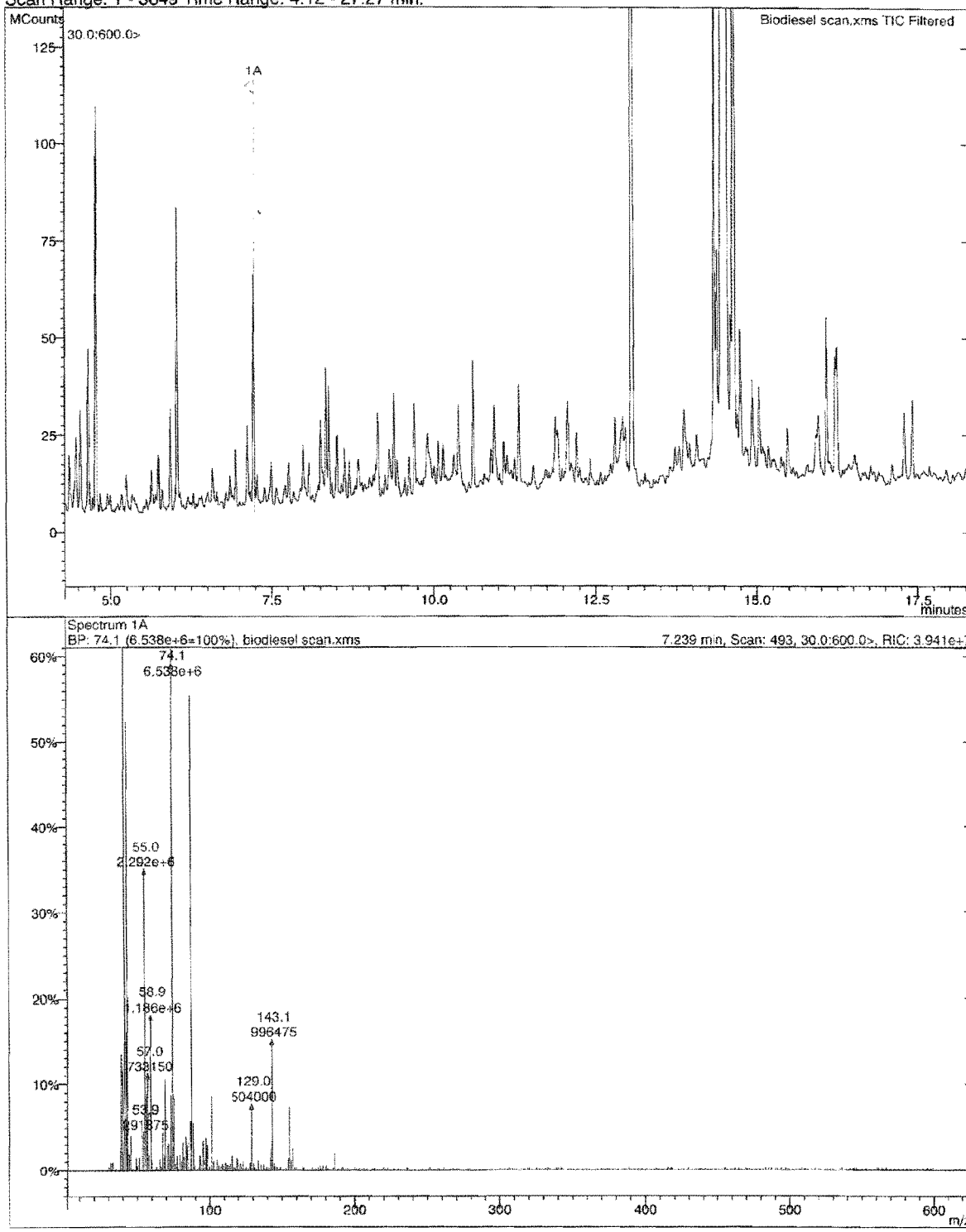
Figure 15:
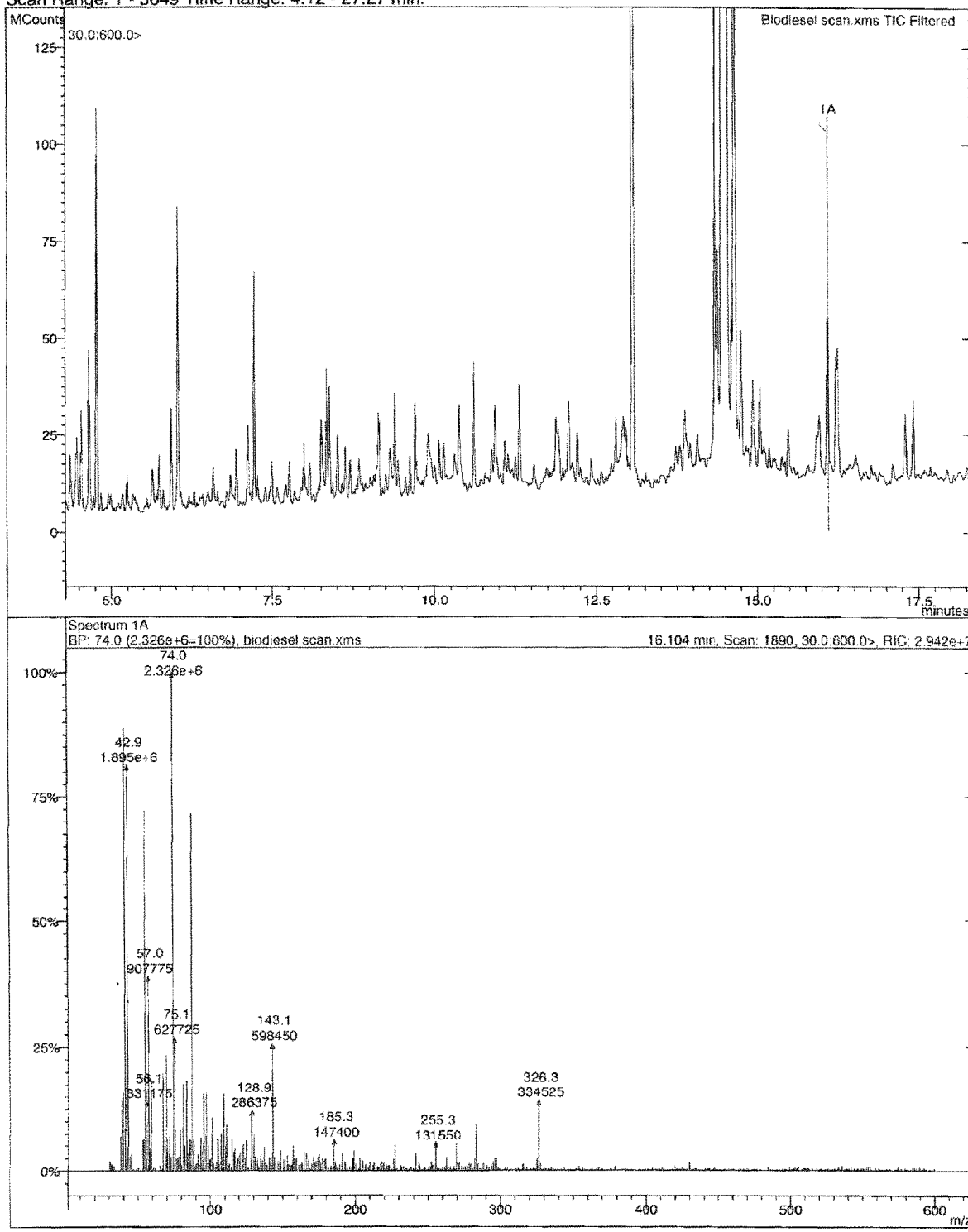

The process described herein can also be advantageously operated in facilities generating biomass in order to extract the triglyceride onsite. The system described herein can be a micro-plant located for example next to fuel or lubricant suppliers, or next to biomass producers, in order reducing the environmental and economic impact associated with transportation of the feedstock or product. In the implementations illustrated in FIG. 4, the system 200 can be a micro-plant including a triglyceride extraction facility 24 being fed with animal or vegetal biomass, preferably generated onsite, and producing the source of triglyceride that is fed to the transesterification unit (which can be sub-system 2 of FIGS. 1 to 3). The process can therefore include producing the biosourced triglyceride from a vegetal biomass or an animal biomass. For example, the process can include extracting a vegetal oil from at least one of, and not limited to, soybeans, canola seeds, sunflower seeds, corn germs, olives, cotton seeds, rapeseeds, linen seeds, algae, coconut, pistachio, jatropha, or any other fruit pits or seeds to produce the biosourced triglyceride.

Single-Phase Composition Implementations

The process as described herein allows producing a single-phase composition comprising fatty acid ester and lipophilic and soluble derivatives of glycerol, such as glycerol carbonate derivatives. The single-phase composition can also include lipophilic and soluble carbonate derivatives of monoglyceride and diglyceride. The produced composition is a one-phase composition (referred to also as the single-phase composition) and avoids subsequent separation steps to remove catalyst, solvent and unwanted compounds (such as free glycerol) that are usually generated via conventional triglyceride transesterification techniques.

The single-phase composition can thus be directly used as a biofuel, as a lubricant, as a biocomponent of a jet fuel, as a biocomponent of a diesel fuel, or as a biocomponent of a lubricant. The term "biocomponent" when used in relation to the singe-phase composition, means that the single-phase composition can be combined with an additive, or used as an additive, to form a composition suitable as diesel, jet fuel or lubricant.

The conversion of the triglyceride of the reaction mixture as described herein and under the process conditions as described herein at least partially lead to a fatty acid ester of formula IV:

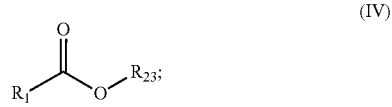

(IV)

wherein $R_1$, $R_2$ and $R_3$ are groups as defined above in relation to the reaction mixture implementations.

The conversion of the triglyceride of the reaction mixture as described herein under the process conditions as described herein can also lead to lipophilic and soluble derivatives of glycerol such as, but not limited to, glycerol carbonates esters (GCEs), monoglyceride alkyl (or aryl) carbonates or diglyceride alkyl (or aryl) carbonates that can be illustrated by the following formula V:

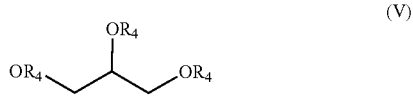

(V)

wherein $R_4$ can be a cyclic carbonate, an alkyl carbonate, an aryl carbonate, fatty acyl moieties, and where each $R_4$ can be different from one another.

Optionally, the single-phase composition can further include lipophilic glycerol derivatives that are formed by rearrangement or decomposition of lipophilic glycerol derivatives of formula V.

In some implementations, the process can include converting the biosourced triglyceride to a fatty acid alkyl ester, upon reaction with a dialkyl carbonate and an alkyl alcohol. The dialkyl carbonate can be dimethyl carbonate and the alkyl alcohol can be methanol, such that when used in the reaction mixture, the formed fatty acid alkyl ester is a fatty acid methyl ester (FAME). In other implementations, depending on the components of the reaction mixture, other examples of fatty acid alkyl ester can include fatty acid ethyl ester (FAEE), fatty acid isopropyl ester (FAiPE), fatty acid butyl ester (FABE) or any combinations thereof. Examples of fatty acid aryl ester can include fatty acid phenyl ester (FAPE), fatty acid tolyl ester (FATE), fatty acid benzyl ester (FABeE) or any combinations thereof.

Indeed, as shown by GCMS analysis presented in the below experimental results, the single-phase composition can mainly include fatty acid ester, but can further include additional compounds forming a remaining. The remaining of the single-phase composition can include any lipophilic and soluble glycerol derivatives such as glycerol carbonate esters derivatives, glycerol carbonate derivatives or a combination thereof. The remaining of the single-phase composition can further include unreacted carbonate ester and alcohol. For example, knowing that dialkyl carbonate can be used as a fuel additive, the process can include controlling the stoichiometry of the reaction to advantageously keep a desired amount of residual dialkyl carbonate in the produced single-phase composition. The same could be done with the alcohol.

In some implementations, a portion of the biosourced triglyceride can also be converted into lipophilic glycerol derivatives, that show suitability for use as biofuel or lubricant. Glycerol, which can be considered as an undesired product in conventional biofuel composition, is herein converted into soluble lipophilic derivatives via the presence of combined alcohol and carbonate ester in the reaction mixture. The nature of those soluble derivatives can vary depending on the specific reaction conditions that are applied. The soluble derivatives can be mainly identified as glycerol cyclic carbonate derivatives, which are suitable for use as biofuel or lubricant.

The process conditions, nature and stoichiometry of the reactants in the reaction mixture can be modulated to provide the desired physicochemical properties to the produced single-phase composition. The physicochemical properties that are controlled include lubricity, cold flow properties, poor point, low temperature homogeneity, flash point, stability, and blending properties of the single-phase composition.

The single-phase composition produced by the techniques described herein can for example comply with the ASTM D675 standard used for conventional fossil diesel fuel, with the EN14214 standard used for biofuel, with the ASTM D6751 standard used for biodiesel, or with typical lubricant standards, and that without performing any additional process steps than those described herein. The single-phase composition can include at least 50% of fatty acid alkyl ester, at most 30% of lipophilic glycerol derivatives, at most 5% of alkyl alcohol and at most 5% of dialkyl carbonate. Optionally, the single-phase composition can include at least 80% of fatty acid alkyl ester, at most 10% of lipophilic glycerol derivatives, at most 5% of alkyl alcohol and at most 5% of dialkyl carbonate. Other examples of a single-phase composition produced by the process defined herein are provided further below in the experimental section. It should be noted that the present process implementations are not limited to producing specific amounts of fatty acid alkyl ester or lypophilic glycerol derivatives, and the process parameters can be modulated to recover a product mixture of varied compositions.

The techniques described herein enable to produce single-phase compositions that are suitable for blending purpose since they are completely miscible with existing diesel, jet fuel, or lubricant over a wide range of blend ratios. For example, the single-phase composition can represent 0.1 to 99% of a diesel, jet fuel or lubricant. In some implementations, the additive can be diesel #2 in combination with the single-phase composition including FAME Other additives can be used in the blend such as, and not limited to, ethanol, acetoacetic esters, dicarboxylic ester, ethylene glycol monoacetate, 2-hydroxy-ethyl esters, diethylene glycol dimethyl ether, sorbitan monooleate and polyoxyethylene sorbitan monooleate, dibutyl maleate, tripropylene glycol monomethyl ester, dimethyl ether, dimethyl carbonate, dimethoxymethane, 1-octylamino-3-octyloxy-2-propanol, N-Octyl nitamine, dimethoxy propane, dimethoxyethane, diesel, dialkyl peroxide, diaryl peroxides, 2-ethylhexyl nitrate, pyrogallol, propylgallate, tert-butylhydroquinone (TBHQ), butylated hydroxyanisole (BHA), polyacrylate, polymethacrylates, or poly(ethylene-co-vinylacetate), paraffine, or any combinations thereof.

It should be noted that the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only. Therefore, the descriptions, examples, methods and materials presented in the claims and the specification are not to be construed as limiting but rather as illustrative only.

It is worth mentioning that throughout the following description when the article "a" is used to introduce an element it does not have the meaning of "only one" it rather means of "one or more". For instance, the unit according to the invention can be provided with one or more reaction and/or separation chamber, one or more confining openwork structure, etc. without departing from the scope of the present invention. It is to be understood that where the specification states that a component, feature, structure, or characteristic "may", "might", "can" or "could" be included, that particular component, feature, structure, or characteristic is not required to be included.

In the following description, the quantitative values are given within an acceptable error range for the particular value as determined by one of ordinary skill in the art, which will depend in part on how the value is measured or determined, i.e. the limitations of the measurement system. It is commonly accepted that a 10% precision measure is acceptable to meet the values described herein.

It should also be understood that any one of the above mentioned optional aspects of the process may be combined with any other of the method, system, reaction mixture, single-phase composition and use aspects thereof, unless two aspects clearly cannot be combined due to their mutually exclusivity. For example, the various operational steps of the process described herein-above, herein-below and/or in the appended Figures, may be combined with any of the structural features of the system described herein and/or in accordance with the appended claims.

EXPERIMENTAL RESULTS

Experimental Set-Up
  The experimental system includes:
    containers maintained under argon atmosphere for components of the reaction mixture
    a pumping assembly, including two HPLC pumps equipped with pressure and flow control
    a tubular heat exchangers composed of an SS316 tube having ⅜ in. of external diameter, 0.277 in of internal diameter and an internal volume of 23.7 mL, and two other SS316 tubes (wrapped around the first SS316 tube) having a ⅛ external diameter, 0.069 inches of internal diameter and an internal volume of 6.62 mL.
    a preheating assembly composed of two SS316 tubes having a ⅛ in. external diameter, 0.069 inches of internal diameter and an internal volume of 6.62 mL finely wrapped over a steel tube covered by a heating tape and isolated with a fiberglass rope.
    a reaction unit including two tubular reactors, each one being composed of a ⅜ inches external diameter, 0.277 in. of internal diameter and an internal volume of 106.6 mL finely wrapped over a steel tube covered by a heating tape and isolated with a fiberglass rope.
    a cooling assembly including a cooler having a ⅜ in. external diameter, 0.277 inches of internal diameter and an internal diameter of 106.6 mL fold into a spiral and air cooled by an electric fan.
    2 back pressure release valves, including one used as a safety valve.
    3 heating controllers
    5 thermocouples
    2 explosion-proof micro-vibrators The experimental equipment was connected in accordance with the system illustrated in FIG. 3. Both feedlines 4 and 10 were mixed through a ⅜ OD SS316 tea union so as to put the feedline 11 in fluid communication with consecutive reaction chambers of the reaction unit 12. The ⅜ OD SS316 heat exchanger is used to pre-cool the single-phase composition, that is further cooled by an air fan while the pressure is maintained by the two back pressure release valves. One of them was set at a higher-pressure release setting and was playing the role of a safety valve. Both back pressure valves were also equipped with an explosion proof micro-vibrator to prevent eventual clogging. The preheater and both reaction chambers were equipped with a heating controller and a thermocouple. Two other thermocouples were installed at an output of the heat exchanger and at the end of the cooler.

HNMR (CDCl3) analysis of the single-phase composition was estimated by assigning the singlet at 7.26 ppm to CDCl3, the singlet at 3.78 ppm to dimethylcarbonate, singlet at 3.66 ppm to FAME, the singlet at 3.48 ppm to MeOH and the multiplet at 2.30 ppm to the $CH_2$ at the alpha position of the fatty acyl moieties of FAME and fatty acid glycerol ester derivative (see Examples 1, 2, 4, 5, 6 and 7).

Example 1

Protocole
  A premixture of 1.5% MeOH in DMC <premixed methanol (300 mL) and Dimethylcarbonate (20 L)> was pumped into the system at a flow rate of 8.9 mL/min. Simultaneously, waste vegetable oil was independently pumped into the system at a flow rate of 29.2 mL/min, such that the molar ratio TG/DMC/MeOH is 1/3.5/0.1. The system was set in order to have a preheater exit temperature of 210° C., reactor 1 exit temperature of 350° C., reactor 2 exit temperature of 360° C. and inlet pressure of 240 bar. After achieving equilibrium state and further cooling, a single-phase composition was recovered. An HNMR (CDCl3) analysis showed a mixture of fatty acid methyl ester (79%), fatty acid glycerol esters derivatives (10%), dimethyl carbonate (9%) and methanol (2%). Conversion of triglyceride into fatty acid methyl ester was 88.5%.

Example 2

Protocole

A pre-mixture of 1.5% MeOH in DMC <premixed methanol (300 mL) and Dimethylcarbonate (20 L)> was pumped into the system at a flow rate of 8.3 mL/min. Simultaneously, waste vegetable oil containing catalytic amount of BHT was pumped into the system at a flow rate of 29.8 mL/min, such as to obtain a molar ratio TG (BHT)/DMC/MeOH of 1/3.2/0.1. The system was set in order to have a preheater exit temperature of 150° C., reactor 1 exit temperature of 315° C., reactor 2 exit temperature of 350° C. and inlet pressure of 250 bar. After achieving equilibrium state and further cooling, a single-phase composition was recovered. An HNMR (CDCl3) analysis showed a mixture of fatty acid methyl ester (88%), fatty acid glycerol ester derivatives (5%), dimethyl carbonate (3%) and methanol (5%). Conversion of triglyceride into fatty acid methyl ester was 95%.

Example 3

Protocole

A pre-mixture of 1.5% MeOH in DMC <premixed methanol (300 mL) and Dimethylcarbonate (20 L)> was pumped into the system at a flow rate of 8.3 mL/min. Simultaneously, waste vegetable oil was pumped into the system at a flow rate of 29.8 mL/min, such as to obtain a molar ratio TG/DMC/MeOH of 1/3.2/0.1. The system was set in order to have a preheater exit temperature of 320° C., reactor 1 exit temperature of 400° C., reactor 2 exit temperature of 400° C. and inlet pressure of 250 bar. After achieving equilibrium state and cooling, a single-phase composition was recovered. An external ASTM analysis showed 0.02% of free glycerin, 0.1% of total glycerin, acid number of 0.1 mg KOH/g, oxidation stability of 2.5 hours, heating value of 15872 BTU/lb, specific gravity of 0.8956 g/mL, 1B copper corrosion test, poor point of −18° C., cloud point of −16° C., Viscosity at 40° C. of 2.2 cst, cetane index of 46.5 and carbon residue of 0.133%. External GCMS was made and showed FAMEs as major products along with several minors products having lower retention times (See FIGS. 5 to 15).

Example 4

Protocole

Inlet 1, which was composed of 3% MeOH in DMC <premixed methanol (540 mL) and Dimethylcarbonate (18 L)>, was pumped into the apparatus at a flow rate of 8.3 mL/min. Simultaneously inlet 2, which was composed of waste vegetable oil containing catalytic amount of BHT, was pumped unto the apparatus at a flow rate of 29.8 mL/min. «Molar ratio TG (BHT)/DMC/MeOH: 1/3.2/0.2» System was set in order to have a preheater exit temperature of 320° C., reactor 1 exit temperature temperature of 400° C., reactor 2 exit temperature of 400° C. and inlet pressure of 250 bar. After achieving equilibrium state and cooling, a single-phase composition was recovered. Thin layer chromatography, eluted with a 1/9 ratio solution of ethyl acetate in hexanes and revealed with KMnO4 and PMA stain, showed completed conversion of triglyceride.

Example 5

Protocole

A pre-mixture of 1.5% MeOH in DMC <premixed methanol (300 mL) and Dimethylcarbonate (20 L)> was pumped into the system at a flow rate of 9.9 mL/min. Simultaneously, a mixture of canola and soy vegetable oil containing catalytic amount of BHT, BHA and dimethylsiloxane, was pumped into the system at a flow rate of 35.5 mL/min, such as to obtain a molar ratio TG/DMC/MeOH of 1/3.2/0.1. The system was set in order to have a preheater exit temperature of 250° C., reactor 1 exit temperature of 332° C., reactor 2 exit temperature of 328° C. and inlet pressure of 250 bar. After achieving equilibrium state and cooling, a single-phase composition was recovered. H NMR (CDCl3) analysis showed a mixture which were attributed to fatty acid methyl ester (FAME) (14.8%), fatty acid glycerol ester derivatives (66.6%), dimethyl carbonate (18.2%) and methanol (0.3%). Conversion of triglyceride into fatty acid methyl ester was 18%.

Example 6

Protocole

The biosourced triglyceride was prepared as follows. 90 kg of dry canola seed were continuously press over an electric press oil producing 60 L of crude oil along with cake as the mass balance. The crude oil was left to settle over 48 hours then continuously filtered at 0.5 micron over cellulosic pad with a filter press. This freshly filtered oil was pumped into the system at a flow rate of 29.8 mL/min. Simultaneously, a pre-mixture of 1.5% MeOH in DMC <premixed methanol (300 mL) and Dimethylcarbonate (20 L)> was pumped into the system at a flow rate of 8.3 mL/min, such as to obtain a molar ratio TG/DMC/MeOH of 1/3.2/0.1. The system was set in order to have a preheater exit temperature of 250° C., reactor 1 exit temperature of 380° C., reactor 2 exit temperature of 380° C. and inlets pressures of 250 bar. During the first 50 minutes the solution produced after cooling was combined to crude oil for retreatment. After this time the equilibrium state was considered achieved and the product was collected after cooling, leading to 75 L of a single-phase composition. Viscosity of this newtonian single phase solution measured with a cannon-fenske opaque viscometer following ASTM D445 standard was 4.9 cSt. H NMR (CDCL3) analysis showed a mixture which was attributed to fatty acid methyl ester (FAME) (50%), fatty acid glycerol ester derivatives (35%), dimethyl carbonate (14%) and methanol (0.4%). Conversion of triglyceride into fatty acid methyl ester was 59%.

Example 7

Protocole

The biosourced triglyceride was prepared as follows. 20 L of crude non-degummed soybean oil was continuously filtered at 0.5 micron over cellulosic pad with a filter press. This freshly filtered oil was pumped into the system at a flow rate of 29.8 mL/min. Simultaneously, a pre-mixture of 1.5% MeOH in DMC <premixed methanol (300 mL) and Dimethylcarbonate (20 L)> was pumped into the system at a flow rate of 8.3 mL/min, such as to obtain a molar ratio TG/DMC/MeOH of 1/3.2/0.1. The system was set in order to have a preheater exit temperature of 250° C., reactor 1 exit temperature of 290° C., reactor 2 exit temperature of 330° C. and inlets pressures of 250 bar. During the first 50 minutes the solution produced after cooling was combined to crude oil for retreatment. After this time the equilibrium state was considered achieved and the product was collected after cooling, leading to 25 Liter of a single-phase composition. Viscosity of this newtonian single phase solution, measured with a cannon-fenske opaque viscometer following ASTM D445 standard, was 4.9 cSt. H NMR (CDCL3) analysis showed a mixture which was attributed to fatty acid methyl ester (FAME) (73%), fatty acid glycerol ester derivatives (16%), dimethyl carbonate (9%) and methanol (1.5%). Conversion of triglyceride into fatty acid methyl ester was 82%.

The invention claimed is:

1. A process for the production of a single-phase composition comprising a fatty acid ester, the process comprising:
   feeding a reaction mixture comprising a biosourced triglyceride, a carbonate ester and an alcohol to a reaction chamber under a reaction pressure;
   heating the reaction mixture to a reaction temperature to operate a transesterification of the biosourced triglyceride with the carbonate ester under catalysis of the alcohol once in the reaction chamber, thereby forming the single-phase composition comprising the fatty acid ester; and
   recovering the single-phase composition from the reaction chamber.

2. The process of claim 1, wherein the feeding of the reaction mixture is performed continuously and the single-phase composition is recovered from the reaction chamber as a continuous process stream.

3. The process of claim 1, comprising adjusting at least one of:
   the amount or nature of the biosourced triglyceride,
   the amount or nature of an antioxidant,
   the amount or nature of the carbonate ester,
   the amount or nature of the alcohol,
   the reaction temperature,
   the reaction pressure, and
   the reaction time in the reaction chamber.

4. The process of claim 3, wherein the adjustment is performed in response to monitored analytical data of the single-phase composition so as to meet selected composition specifications.

5. The process of claim 1, wherein the single-phase composition further comprises lipophilic glycerol derivatives, optionally fatty acid glycerol ester derivatives, further optionally glycerol carbonate esters.

6. The process of claim 1, wherein the alcohol is present in a catalytic amount between 0.01 and 0.5 eq of alcohol with respect to triglycerides.

7. The process of claim 1, wherein the conversion of the biosourced triglyceride into the fatty acid ester is at least 10%, 20%, 30%, 40%, 50%, 60%, 70%, 80%, or 90%.

8. The process of claim 1, wherein the reaction mixture fed to the reaction chamber has a molar ratio of biosourced triglyceride over the carbonate ester between 1:0.1 and 1:20.

9. The process of claim 1, wherein the reaction temperature is between 50° C. and 500° C., the reaction pressure is between 13 and 5000 psi, and the reaction time is between 0.1 and 120 minutes.

10. The process of claim 1, wherein the feeding of the reaction mixture to the reaction chamber comprises premixing the alcohol and the carbonate ester to form a pre-mixture and then combining the triglyceride with the pre-mixture to form the reaction mixture that is fed to the reaction chamber.

11. The process of claim 1, wherein the feeding of the reaction mixture comprises feeding a pre-mixture of alcohol and carbonate ester to a first inlet of the reaction chamber, and simultaneously feeding the triglyceride to a second inlet of the reaction chamber.

12. The process of claim 1, comprising producing the biosourced triglyceride from a vegetal biomass.

13. The process of claim 1, comprising feeding the single-phase composition to an additional reaction chamber before recovering the single-phase composition and subjecting the additional reaction chamber to another reaction temperature and/or another reaction pressure.

14. The process of claim 1, comprising preheating the reaction mixture before feeding thereof to the reaction chamber.

15. A single-phase composition comprising a fatty acid ester and produced by the process as defined in claim 1, wherein:
   the biosourced triglyceride is of formula I:

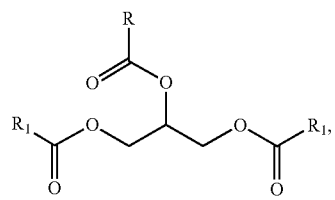

the carbonate ester is of formula II:

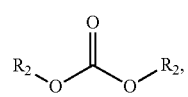

the alcohol is of formula III:

and the fatty acid ester is of formula IV:

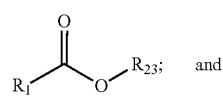

wherein $R_1$ is a functional group derived from a fatty acid whose nature can differ from one $R_1$ to another $R_1$ of the triglyceride; and each of $R_2$ and $R_3$ is an alkyl group, and aryl group or a glycerol carbonate derivative.

16. The single-phase composition of claim 15, wherein the single-phase composition after reaction further comprises soluble and lipophilic glycerol derivaties, optionally glycerol carbonate ester derivatives.

17. The single-phase composition of claim 16, wherein the single-phase composition after reaction consists of lipophilic glycerol derivatives, carbonate ester and alcohol.

18. A composition comprising the single-phase composition as defined in claim 16, and an additive selected for diesel, jet fuel or lubricant application.

19. A method for the conversion of biosourced triglycerides into fatty acid esters comprising:
   combining the biosourced triglycerides with a carbonate ester in the presence of a catalytic amount of an alcohol,
   wherein the molar ratio of the biosourced triglyceride to the carbonate ester is between 1:0.1 and 1:20 and the molar ratio of the biosourced triglyceride to the alcohol is between 1:0.01 and 1:0.5.

20. The process of claim 1, comprising producing the biosourced triglyceride from an animal biomass.

\* \* \* \* \*